United States Patent
Nakajima et al.

(10) Patent No.: US 10,889,776 B2
(45) Date of Patent: Jan. 12, 2021

(54) REFRIGERATING MACHINE OIL, AND COMPOSITION FOR REFRIGERATING MACHINE

(71) Applicant: IDEMITSU KOSAN CO., LTD., Chiyoda-ku (JP)

(72) Inventors: So Nakajima, Edogawa-ku (JP); Tomoya Matsumoto, Funabashi (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 4 days.

(21) Appl. No.: 16/318,417

(22) PCT Filed: Dec. 19, 2017

(86) PCT No.: PCT/JP2017/045584
§ 371 (c)(1),
(2) Date: Jan. 17, 2019

(87) PCT Pub. No.: WO2018/117115
PCT Pub. Date: Jun. 28, 2018

(65) Prior Publication Data
US 2019/0292476 A1    Sep. 26, 2019

(30) Foreign Application Priority Data

Dec. 20, 2016    (JP) .................... 2016-247063

(51) Int. Cl.
| C10M 107/00 | (2006.01) |
| C10M 107/24 | (2006.01) |
| C09K 5/04 | (2006.01) |
| C10N 40/30 | (2006.01) |

(52) U.S. Cl.
CPC ............. *C10M 107/24* (2013.01); *C09K 5/04* (2013.01); *C09K 5/045* (2013.01); *C10M 2209/04* (2013.01); *C10N 2040/30* (2013.01)

(58) Field of Classification Search
CPC .......... C10M 107/24; C10M 2209/043; C10M 145/34
See application file for complete search history.

(56) References Cited

U.S. PATENT DOCUMENTS

| 5,449,472 | A | 9/1995 | Egawa et al. |
| 6,656,891 | B1 * | 12/2003 | Sakanoue ............ C10M 169/04 508/579 |
| 2007/0164252 | A1 | 7/2007 | Tokiai |
| 2007/0290164 | A1 | 12/2007 | Kaneko |
| 2014/0135241 | A1 | 5/2014 | Matsumoto |
| 2015/0275119 | A1 * | 10/2015 | Kisen ................. C10M 171/008 252/68 |
| 2015/0300698 | A1 | 10/2015 | Tanaka et al. |
| 2017/0073602 | A1 | 3/2017 | Takahashi et al. |

FOREIGN PATENT DOCUMENTS

| EP | 1 734 101 A1 | 12/2006 |
| JP | 6-128578 A | 5/1994 |
| JP | 10-147682 A | 6/1998 |
| JP | 2013-14672 A | 1/2013 |
| JP | 2013-14673 A | 1/2013 |
| JP | 2015-54928 A | 3/2015 |
| JP | 2015-172205 A | 10/2015 |
| WO | WO 2005/095557 A1 | 10/2005 |
| WO | WO 2006/030748 A1 | 3/2006 |
| WO | WO 2014/051108 A1 | 4/2014 |
| WO | WO 2014/069603 A1 | 5/2014 |
| WO | WO 2015/119080 A1 | 8/2015 |
| WO | WO 2016/190286 A1 | 12/2016 |

OTHER PUBLICATIONS

International Search Report dated Jan. 30, 2018, in PCT/JP2017/045584 filed on Dec. 19, 2017.
Extended European Search Report dated Jun. 22, 2020 in European Patent Application No. 17884305.8, 8 pages.
Japanese Office Action dated Jun. 23, 2020 in Japanese Patent Application No. 2016-247063 (with unedited computer generated English translation), 8 pages.

* cited by examiner

*Primary Examiner* — John R Hardee
(74) *Attorney, Agent, or Firm* — Oblon, McClelland, Maier & Neustadt, L.L.P.

(57) ABSTRACT

The present invention relates to a refrigerator oil containing a specified amount of a polyvinyl ether-based compound (A) containing a structural unit (a1) having a methoxy group in a side chain thereof and a specified amount of a polyvinyl ether-based compound (B) containing a structural unit (b2) of a specified structure; a refrigerator oil composition containing the refrigerator oil; and a production method the refrigerator oil.

14 Claims, No Drawings

REFRIGERATING MACHINE OIL, AND COMPOSITION FOR REFRIGERATING MACHINE

TECHNICAL FIELD

The present invention relates to a refrigerator oil, a refrigerator oil composition containing the refrigerator oil, and a method of producing the refrigerator oil.

BACKGROUND ART

In general, a compression-type refrigerator has a structure such that not only it is configured of at least a compressor, a condenser, an expansion mechanism (such as an expansion valve), an evaporator, and so on, but also a mixture of a refrigerant and a refrigerator oil (hereinafter also referred to as "refrigerator oil composition") is circulated within a closed system.

As the refrigerant which is used for compression-type refrigerators, fluorinated hydrocarbon compounds with a low environmental load have been being used in place of conventionally frequently used hydrochlorofluorocarbon (HCFC). As the fluorinated hydrocarbon compounds, saturated fluorinated hydrocarbon compounds (HFC: Hydro-Fluoro-Carbon), such as 1,1,1,2-tetrafluoroethane (R134a), difluoromethane (R32), and a mixture of difluoromethane and pentafluoroethane (R410A), are frequently used. In recent years, investigations regarding refrigerants containing R32 having a lower global warming potential is advanced.

In addition, use of unsaturated fluorinated hydrocarbon compounds (HFO: Hydro-Fluoro-Olefin) having a low global warming potential, such as 1,3,3,3-tetrafluoropropene (R1234ze) and 2,3,3,3-tetrafluoropropene (R1234yf), is also investigated.

For example, as the refrigerator oil which is used for a refrigerant containing a saturated fluorinated hydrocarbon, those obtained by blending a polyvinyl ether compound, such as polyethyl vinyl ether and an ethyl vinyl ether/isobutyl vinyl ether copolymer, with an additive, such as an antioxidant, an acid scavenger, and an extreme pressure agent, are known (see, for example, PTLs 1 and 2).

In addition, for example, as the refrigerator oil which is used for a refrigerant containing an unsaturated fluorinated hydrocarbon, those containing, as a base oil, a polyol ester and a polyoxyalkylene glycol in a mass ratio of 10/90 to 98/2 are known (see, for example, PTL 3).

CITATION LIST

Patent Literature

PTL 1: JP 2013-14672 A
PTL 2: JP 2013-14673 A
PTL 3: JP 2015-54928 A

SUMMARY OF INVENTION

Technical Problem

In compression-type refrigerators having the aforementioned structure, depending upon the kind of an apparatus, in general, the temperature becomes high within the compressor, whereas it becomes low within the condenser, and therefore, the refrigerant and the lubricating oil are required to be circulated within this system without causing phase separation in a wide temperature range of from low temperatures to high temperatures.

For that reason, in the compression-type refrigerators, the development of a refrigerator oil having excellent compatibility with the refrigerant over a wider temperature range of from low temperatures to high temperatures is demanded.

Furthermore, the refrigerator oil to be used is also required to have favorable storage stability under a low temperature condition.

In view of the foregoing problems, the present invention has been made. A problem of the present invention is to provide a refrigerator oil which is not only excellent in compatibility with a refrigerant but also favorable in storage stability.

Solution to Problem

The present inventors made extensive and intensive investigations. As a result, it has been found that a refrigerator oil containing a polyvinyl ether-based compound (A) containing a specified amount of a structural unit (a1) having a methoxy group in a side chain thereof and a polyvinyl ether-based compound (B) containing a specified amount of a structural unit (b2) of a specified structure is capable of solving the aforementioned problem. The present invention has been accomplished on a basis of such a finding. Specifically, in accordance with the respective embodiments of the present invention, the following [1] to [4] are provided.

[1] A refrigerator oil containing:
a polyvinyl ether-based compound (A) containing a structural unit (a1) having a methoxy group in a side chain thereof in an amount of 50 mol % or more on a basis of 100 mol % of the whole amount of structural units excluding a terminal structural unit in a molecular structure thereof; and
a polyvinyl ether-based compound (B) containing a structural unit (b2) represented by the following general formula (2) in an amount of more than 50 mol % on a basis of 100 mol % of the whole amount of structural units excluding a terminal structural unit in a molecular structure thereof:

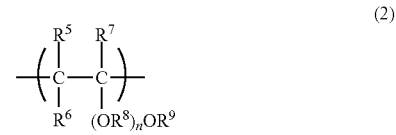

wherein $R^5$, $R^6$, and $R^7$ each independently represent a hydrogen atom or a hydrocarbon group having 1 or more and 8 or less carbon atoms; $R^8$ represents a divalent hydrocarbon group having 2 or more and 10 or less carbon atoms; n represents a number of 0 or more and 10 or less; and $R^9$ represents a hydrocarbon group having 2 or more and 10 or less carbon atoms.

[2] A refrigerator oil composition containing the refrigerator oil as set forth in the above [1] and a refrigerant.

[3] A method of producing a refrigerator oil, including blending at least
a polyvinyl ether-based compound (A) containing a structural unit (a1) having a methoxy group in a side chain thereof in an amount of 50 mol % or more on a basis of 100 mol % of the whole amount of structural units excluding a terminal structural unit in a molecular structure thereof; and
a polyvinyl ether-based compound (B) containing a structural unit (b2) represented by the following general formula (2) in an amount of more than 50 mol % on a basis of 100 mol % of the whole amount of structural units excluding a terminal structural unit in a molecular structure thereof, to obtain a refrigerator oil:

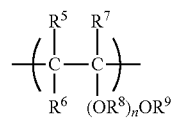
(2)

wherein $R^5$, $R^6$, and $R^7$ each independently represent a hydrogen atom or a hydrocarbon group having 1 or more and 8 or less carbon atoms; $R^8$ represents a divalent hydrocarbon group having 2 or more and 10 or less carbon atoms; n represents a number of 0 or more and 10 or less; and $R^9$ represents a hydrocarbon group having 2 or more and 10 or less carbon atoms.

[4] A refrigerator having the refrigerator oil as set forth in the above [1] or the refrigerator oil composition as set forth in the above [2] filled therein.

Advantageous Effects of Invention

It is possible to provide a refrigerator oil which is not only excellent in compatibility with a refrigerant but also favorable in storage stability.

Description of Embodiments

[Refrigerator Oil]

A refrigerator oil according to one embodiment of the present invention (hereinafter referred to simply as "refrigerator oil") contains, as a component (A), a polyvinyl ether-based compound (A) containing a structural unit (a1) having a methoxy group in a side chain thereof in an amount of 50 mol % or more on a basis of 100 mol % of the whole amount of structural units excluding a terminal structural unit in a molecular structure thereof; and, as component (B), a polyvinyl ether-based compound (B) containing a structural unit (b2) represented by the following general formula (2) in an amount of more than 50 mol % on a basis of 100 mol % of the whole amount of structural units excluding a terminal structural unit in a molecular structure thereof.

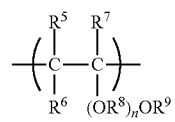
(2)

In the general formula (2), $R^5$, $R^6$, and $R^7$ each independently represent a hydrogen atom or a hydrocarbon group having 1 or more and 8 or less carbon atoms; $R^8$ represents a divalent hydrocarbon group having 2 or more and 10 or less carbon atoms; n represents a number of 0 or more and 10 or less; and $R^9$ represents a hydrocarbon group having 2 or more and 10 or less carbon atoms.

In view of the fact that the aforementioned refrigerator oil contains both the component (A) and the component (B), it is not only excellent in compatibility with a refrigerant but also favorable in storage stability.

The respective components which are contained in the refrigerator oil are hereunder described.

<Polyvinyl Ether-Based Compound (A)>

The polyvinyl ether-based compound (A) which is used in the refrigerator oil is a compound having a polyvinyl ether structure and contains a structural unit (a1) having a methoxy group in a side chain thereof (hereinafter also referred to simply as "component (A)"). The component (A) contains the structural unit (a1) in an amount of 50 mol % or more on a basis of 100 mol % of the whole amount of structural units excluding a terminal structural unit of the component (A) as mentioned later, in a molecular structure of the component (A).

In view of the fact that the refrigerator oil contains the component (A), even under any of a low-temperature environment and a high-temperature environment, it is excellent in compatibility with a refrigerant and hardly causes separation of the refrigerator oil and the refrigerant from each other.

In the refrigerator oil, the component (A) may be contained alone, or may be contained in combination of two or more thereof.

(Structural Unit (a1))

The structural unit (a1) which the polyvinyl ether-based compound (A) contains in a molecular structure thereof is one having a methoxy group in a side chain thereof, and preferably one represented by the following general formula (1).

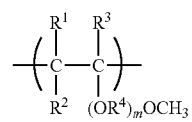
(1)

In the general formula (1), $R^1$, $R^2$, and $R^3$ each independently represent a hydrogen atom or a hydrocarbon group having 1 or more and 8 or less carbon atoms; $R^4$ represents a divalent hydrocarbon group having 2 or more and 10 or less carbon atoms; and m represents a number of 0 or more and 10 or less.

The carbon number of the hydrocarbon group having 1 or more and 8 or less carbon atoms, which may be selected as $R^1$ to $R^3$, is preferably 1 or more and 6 or less, more preferably 1 or more and 4 or less, and still more preferably 1 or 2.

Examples of the hydrocarbon group having 1 or more and 8 or less carbon atoms include alkyl groups, such as a methyl group, an ethyl group, a n-propyl group, an isopropyl group, a n-butyl group, an isobutyl group, a sec-butyl group, a tert-butyl group, various pentyl groups, various hexyl groups, various heptyl groups, and various octyl groups; cycloalkyl groups, such as a cyclopentyl group, a cyclohexyl group, various methylcyclohexyl groups, various ethylcyclohexyl groups, and various dimethylcyclohexyl groups; aryl groups, such as a phenyl group, various methylphenyl groups, various ethylphenyl groups, and various dimethylphenyl groups; and arylalkyl groups, such as a benzyl group, various phenylethyl groups, and various methylbenzyl groups.

Above all, it is preferred that all of $R^1$ to $R^3$ are a hydrogen atom or an alkyl group, and it is more preferred that all of $R^1$ to $R^3$ are a hydrogen atom.

$R^1$'s, $R^2$'s, or $R^3$'s in the general formula (1) may be the same or different in each structural unit. That is, the polyvinyl ether-based compound (A) may include a copolymer including the structural units where some or all of $R^1$ to $R^3$ are different in each structural unit.

The carbon number of the divalent hydrocarbon group having 2 or more and 10 or less carbon atoms, which may be selected as $R^4$, is preferably 2 or more and 6 or less, and more preferably 2 or more and 4 or less.

Examples of the divalent hydrocarbon group which may be selected as $R^4$ include alkylene groups, such as an ethylene group, a phenylethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, and various decylene groups; divalent alicyclic hydrocarbon groups, such as a cyclohexylene group, a methylcyclohexylene group, an ethylcyclohexylene group, a dimethylcyclohexylene group, and a propylcyclohexylene group; divalent aromatic hydrocarbon groups, such as various phenylene groups, various methylphenylene groups, various ethylphenylene groups, various dimethylphenylene groups, and various naphthylene groups; divalent alkyl aromatic hydrocarbon groups having a monovalent binding site in each of an alkyl group moiety and an aromatic moiety of an alkyl aromatic hydrocarbon, such as toluene and ethylbenzene; and divalent alkyl aromatic hydrocarbon groups having a binding site in an alkyl group moiety of a polyalkyl aromatic hydrocarbon, such as xylene and diethylbenzene.

Of these, $R^4$ is preferably an alkylene group, and more preferably an alkylene group having 2 or more and 4 or less carbon atoms.

m represents a number of 0 or more and 10 or less, preferably 0 or more and 3 or less, more preferably 0 or more and 2 or less, still more preferably 0 or 1, and yet still more preferably 0. In the case where m is 0, the carbon atom with which $R^3$ is bound and the oxygen atom of $OCH_3$ are bound with each other. In addition, in the case where m is 2 or more, plural $R^4$'s may be the same as or different from each other.

The component (A) may contain other structural unit than the structural unit (a1).

However, the content of the structural unit (a1) is 50 mol % or more and 100 mol % or less, preferably 60 mol % or more and 100 mol % or less, more preferably 70 mol % or more and 100 mol % or less, still more preferably 80 mol % or more and 100 mol % or less, and yet still more preferably 100 mol % on a basis of the whole amount (100 mol %) of the structural units excluding a terminal structural unit in a molecular structure terminal of the component (A) as mentioned later.

[Structural Unit (a1-1)]

The structural unit (a1) is preferably a structural unit (a1-1) represented by the following general formula (1-1).

In view of the fact that the component (A) contains the structural unit (a1-1), the compatibility of the resulting refrigerator oil with the refrigerant is more improved. In addition, the production of the component (A) becomes easy.

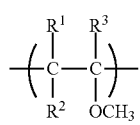

(1-1)

In the general formula (1-1), $R^1$, $R^2$, and $R^3$ each independently represent a hydrogen atom or a hydrocarbon group having 1 or more and 8 or less carbon atoms.

In the general formula (1-1), $R^1$, $R^2$, and $R^3$ are the same as $R^1$, $R^2$, and $R^3$ in the general formula (1) as mentioned above, and therefore, their explanations are omitted.

The content of the structural unit (a1-1) is preferably 50 mol % or more and 100 mol % or less, more preferably 70 mol % or more and 100 mol % or less, still more preferably 80 mol % or more and 100 mol % or less, and yet still more preferably 100 mol % on a basis of the whole amount (100 mol %) of the structural unit (a1) which is contained in the component (A).

[Structural Unit (a1-2)]

The structural unit (a1) is more preferably a structural unit (a1-2) represented by the following general formula (1-2).

In view of the fact that the component (A) contains the structural unit (a1-2) represented by the general formula (1-2), the compatibility of the resulting refrigerator oil with the refrigerant is still more improved. In addition, the production of the component (A) becomes easier.

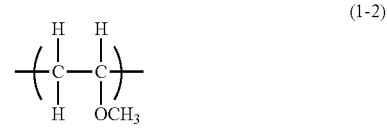

(1-2)

The content of the structural unit (a1-2) represented by the general formula (1-2) is preferably 50 mol % or more and 100 mol % or less, more preferably 70 mol % or more and 100 mol % or less, still more preferably 80 mol % or more and 100 mol % or less, and yet still more preferably 100 mol % on a basis of 100 mol % of the whole amount of the structural unit (a1) which is contained in the component (A).

(Structural Unit of Molecular Terminal of Polyvinyl Ether-Based Compound (A))

The terminal moiety of the molecular structure of the polyvinyl ether-based compound (A) may be represented by a monovalent group derived from, for example, a saturated hydrocarbon, an ether, an alcohol, a ketone, an amide, nitrile, etc. (hereinafter also referred to as "terminal structural unit").

In one embodiment of the present invention, it is preferred that at least one of the terminal structural units of the component (A) is a terminal structural unit (a11-1) represented by the following general formula (11-1).

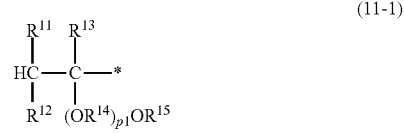

(11-1)

In the general formula (11-1), $R^{11}$, $R^{12}$, and $R^{13}$ each independently represent a hydrogen atom or a hydrocarbon group having 1 or more and 8 or less carbon atoms. The carbon number which the foregoing hydrocarbon group having 1 or more and 8 or less carbon atoms has is preferably 1 or more and 6 or less, more preferably 1 or more and 4 or less, and still more preferably 1 or 2.

$R^{14}$ represents a divalent hydrocarbon group having 2 or more and 10 or less carbon atoms. The carbon number of the divalent hydrocarbon group having 2 or more and 10 or less carbon atoms, which may be selected as $R^{14}$, is preferably 2 or more and 6 or less, and more preferably 2 or more and 4 or less.

p1 represents a number of 0 or more and 10 or less, preferably 0 or more and 3 or less, more preferably 0 or more and 2 or less, still more preferably 0 or 1, and yet still more preferably 0. In the case where p1 is 0, the oxygen atom of $OR^{15}$ and the carbon atom with which $R^{13}$ is bound are bound with each other. In addition, in the case where p1 is 2 or more, plural $R^{14}$'s may be the same as or different from each other.

$R^{15}$ represents a hydrocarbon group having 1 or more and 10 or less carbon atoms. The carbon number which the foregoing hydrocarbon group having 1 or more and 10 or less carbon atoms has is preferably 1 or more and 8 or less, more preferably 1 or more and 6 or less, still more preferably 1 or more and 4 or less, yet still more preferably 1 or 2, and even yet still more preferably 1.

* represents a binding site to other structural unit than the terminal structural units, such as the structural unit (a1).

Furthermore, in one embodiment of the present invention, one of the terminal structural units of the component (A) is the terminal structural unit (a11-1) represented by the general formula (11-1), and the other is preferably any of a terminal structural unit (a11-2) represented by the following general formula (11-2), a terminal structural unit (a11-3) represented by the following general formula (11-3), and a terminal structural unit (a11-4) represented by the following general formula (11-4), or a terminal structural unit having an olefinically unsaturated bond, and more preferably a terminal structural unit (a11-2) represented by the following general formula (11-2).

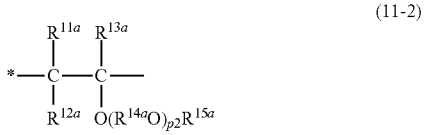
(11-2)

In the general formula (11-2), $R^{11a}$, $R^{12a}$, and $R^{13a}$ each independently represent a hydrogen atom or a hydrocarbon group having 1 or more and 8 or less carbon atoms. The carbon number which the foregoing hydrocarbon group having 1 or more and 8 or less carbon atoms has is preferably 1 or more and 6 or less, more preferably 1 or more and 4 or less, and still more preferably 1 or 2.

$R^{14a}$ represents a divalent hydrocarbon group having 2 or more and 10 or less carbon atoms. The carbon number of the divalent hydrocarbon group having 2 or more and 10 or less carbon atoms, which may be selected as $R^{14a}$, is preferably 2 or more and 6 or less, and more preferably 2 or more and 4 or less.

p2 represents a number of 0 or more and 10 or less, preferably 0 or more and 3 or less, more preferably 0 or more and 2 or less, still more preferably 0 or 1, and yet still more preferably 0. In the case where p2 is 0, $(R^{14a}O)_0$ represents a single bond. In addition, in the case where p2 is 2 or more, plural $R^{14a}$'s may be the same as or different from each other.

$R^{15a}$ represents a hydrocarbon group having 1 or more and 10 or less carbon atoms. The carbon number which the hydrocarbon group having 1 or more and 10 or less carbon atoms and being capable of being selected as $R^{15a}$ has is preferably 1 or more and 8 or less, more preferably 1 or more and 6 or less, still more preferably 1 or more and 4 or less, yet still more preferably 1 or 2, and even yet still more preferably 1.

* represents a binding site to other structural unit than the terminal structural units, such as the structural unit (a1).

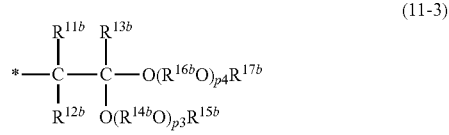
(11-3)

In the general formula (11-3), $R^{11b}$, $R^{12b}$, and $R^{13b}$ each independently represent a hydrogen atom or a hydrocarbon group having 1 or more and 8 or less carbon atoms. The carbon number which the foregoing hydrocarbon group having 1 or more and 8 or less carbon atoms has is preferably 1 or more and 6 or less, more preferably 1 or more and 4 or less, and still more preferably 1 or 2.

$R^{14b}$ and $R^{16b}$ each independently represent a divalent hydrocarbon group having 2 or more and 10 or less carbon atoms. The carbon number of the divalent hydrocarbon group having 2 or more and 10 or less carbon atoms, which may be selected as $R^{14b}$ and $R^{16b}$, respectively, is preferably 2 or more and 6 or less, and more preferably 2 or more and 4 or less.

p3 and p4 each independently represents a number of 0 or more and 10 or less, preferably 0 or more and 3 or less, more preferably 0 or more and 2 or less, still more preferably 0 or 1, and yet still more preferably 0. In the case where p3 is 0, $(R^{14b}O)_0$ represents a single bond. In addition, in the case where p4 is 0, $(R^{16b}O)_0$ represents a single bond. In addition, in the case where p3 is 2 or more, plural $R^{14b}$'s may be the same as or different from each other. In addition, in the case where p4 is 2 or more, plural $R^{16b}$'s may be the same as or different from each other.

$R^{15b}$ and $R^{17b}$ each independently represent a hydrocarbon group having 1 or more and 10 or less carbon atoms. The carbon number of the hydrocarbon group having 1 or more and 10 or less carbon atoms, which may be selected as $R^{15b}$ and $R^{17b}$, respectively, is preferably 1 or more and 8 or less, more preferably 1 or more and 6 or less, still more preferably 1 or more and 4 or less, yet still more preferably 1 or 2, and even yet still more preferably 1.

* represents a binding site to other structural unit than the terminal structural units, such as the structural unit (a1).

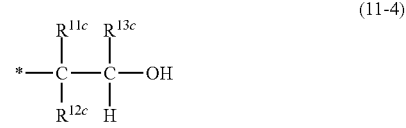
(11-4)

In the general formula (11-4), $R^{11c}$, $R^{12c}$, and $R^{13c}$ each independently represent a hydrogen atom or a hydrocarbon group having 1 or more and 8 or less carbon atoms. The carbon number which the foregoing hydrocarbon group having 1 or more and 8 or less carbon atoms has is preferably 1 or more and 6 or less, more preferably 1 or more and 4 or less, and still more preferably 1 or 2.

* represents a binding site to other structural unit than the terminal structural units, such as the structural unit (a1).

In the aforementioned general formulae (11-1), (11-2), (11-3), and (11-4), examples of the hydrocarbon group having 1 or more and 8 or less carbon atoms, which may be selected as $R^{11}$ to $R^{13}$, $R^{11a}$ to $R^{13a}$, $R^{11b}$ to $R^{13b}$, and $R^{11c}$ to $R^{13c}$, respectively, include the same hydrocarbon groups as the hydrocarbon group having 1 or more and 8 or less carbon atoms, which may be selected as $R^1$ to $R^3$ in the general formula (1). In addition, suitable embodiments which may be selected as $R^{11}$ to $R^{13}$, $R^{11a}$ to $R^{13a}$, $R^{11b}$ to $R^{13b}$, and $R^{11c}$ to $R^{13c}$, respectively, are the same as the suitable embodiments which may be selected as $R^1$ to $R^3$ in the general formula (1).

Examples of the divalent hydrocarbon group having 2 or more and 10 or less carbon atoms, which may be selected as $R^{14}$, $R^{14a}$, $R^{14b}$, and $R^{16b}$, respectively, include the same divalent hydrocarbon groups as the divalent hydrocarbon group having 2 or more and 10 or less carbon atoms, which may be selected as $R^4$ in the general formula (1). In addition, suitable embodiments which may be selected as $R^{14}$, $R^{14a}$, $R^{14b}$, and $R^{16b}$, respectively, are the same as the suitable embodiments which may be selected as $R^4$ in the general formula (1).

Examples of the hydrocarbon group, which may be selected as $R^{15}$, $R^{15a}$, $R^{15b}$, and $R^{17b}$), respectively, include, in addition to the same groups as the hydrocarbon group having 1 or more and 8 or less carbon atoms, which may be selected as $R^1$ to $R^3$ in the aforementioned general formula (1), alkyl groups, such as various nonyl groups and various decyl groups; cycloalkyl groups, such as various propylcyclohexyl groups and various trimethylcyclohexyl groups; aryl groups, such as various propylphenyl groups, various trimethylphenyl groups, various butylphenyl groups, and various naphthyl groups; and arylalkyl groups, such as various phenylpropyl groups and various phenylbutyl groups.

Of these, $R^{15}$, $R^{15a}$, $R^{15b}$, and $R^{17b}$ are each preferably an alkyl group, more preferably an alkyl group having 1 or more and 4 or less carbon atoms, still more preferably an alkyl group having 1 or 2 carbon atoms, and yet still more preferably a methyl group.

(Synthesis Method of Polyvinyl Ether-Based Compound (A))

A synthesis method of the polyvinyl ether-based compound (A) is not particularly limited, and there is exemplified a method in which using a raw material monomer capable of forming the structural unit (a1) and optionally, other raw material monomer (for example, a raw material monomer capable of forming a structural unit (b2) as mentioned later), the synthesis is performed by various means of polymerization (e.g., radical polymerization, cationic polymerization, and radiation polymerization).

Examples of the raw material monomer capable of forming the structural unit (a1) include a vinyl ether-based monomer represented by the following general formula (I).

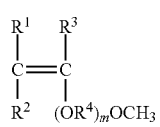

(I)

In the general formula (I), $R^1$, $R^2$, $R^3$, $R^4$, and m are the same as defined for $R^1$, $R^2$, $R^3$, $R^4$, and m in the general formula (1), and suitable embodiments thereof are also the same.

As the synthesis method of the component (A), from the viewpoint of obtaining the component (A) having a desired kinematic viscosity, a method in which the raw material monomer is added in the system in the presence of a polymerization catalyst and a polymerization initiator, thereby advancing the polymerization reaction is preferred.

Examples of the polymerization catalyst include a Lewis acid, a Brønsted acid, and an organometallic compound. Of these, a Lewis acid is preferred.

Examples of the Lewis acid include boron trifluoride, aluminum trichloride, aluminum tribromide, tin tetrachloride, zinc dichloride, and ferric chloride, with boron trifluoride being preferred.

Examples of the Brønsted acid include hydrofluoric acid, hydrochloric acid, hydrobromic acid, hydroiodic acid, nitric acid, sulfuric acid, trichloroacetic acid, and trifluoroacetic acid.

Examples of the organometallic compound include diethylaluminum chloride, ethylaluminum chloride, and diethylzinc.

Examples of the polymerization initiator include water, an alcohol, a phenol, an acetal, and an adduct between a vinyl ether and a carboxylic acid. These may be used either alone or in combination of two or more thereof. The terminal moiety of the resulting component (A), namely the terminal structural unit is formed according to the kind of such a polymerization initiator.

Examples of the alcohol include saturated aliphatic alcohols having 1 or more and 20 or less carbon atoms, such as methanol, ethanol, propanol, isopropanol, butanol, isobutanol, sec-butanol, tert-butanol, various pentanols, various hexanols, various heptanols, and various octanols; unsaturated aliphatic alcohols having 3 or more and 10 or less carbon atoms, such as allyl alcohol; and ether bound oxygen-containing alcohols having 14 or less carbon atoms, such as an ethylene glycol monoalkyl ether and an ethylene glycol monoaryl ether.

Examples of the phenol include phenol and various cresols.

Examples of the acetal include acetaldehyde dimethyl acetal, acetaldehyde diethyl acetal, acetaldehyde methylethyl acetal, and acetaldehyde bis(methoxyethyl) acetal.

Examples of the adduct between of a vinyl ether and a carboxylic acid include adducts between a vinyl ether and acetic acid, propionic acid, n-butyric acid, isobutyric acid, 3,5,5-trimethylcaproic acid, etc.

At a polymerization initiating terminal of the resulting component (A), in the case of using water, an alcohol, or a phenol, hydrogen is bound, and in the case of using an acetal used, one resulting from elimination of one of the alkoxy groups from the acetal is bound. In addition, in the case of using an adduct between a vinyl ether and a carboxylic acid, one resulting from elimination of an alkyl carbonyloxy group derived from the carboxylic acid moiety from the adduct of the vinyl ether and the carboxylic acid is bound.

Meanwhile, in the case of using water, an alcohol, a phenol, or an acetal, the stopped terminal of the component (A) becomes an acetal, an olefin, or an aldehyde. In addition, in the case of an adduct between a vinyl ether and a carboxylic acid, the stopped terminal of the component (A) becomes a carboxylic acid ester of a hemiacetal, and when hydrolyzed in the presence of an acid, it becomes an aldehyde.

Depending upon the kind of the raw material monomer or polymerization initiator to be used, the polymerization reaction is performed at a temperature of preferably −80° C. or higher and 150° C. or lower, and more preferably 0° C. or higher and 100° C. or lower, and it is preferred to terminate the polymerization reaction for from 10 seconds to 10 hours after commencement of the reaction.

The polymerization reaction is typically performed in the presence of a solvent. Although the solvent to be used is not particularly limited so long as it is not only able to dissolve a necessary amount of the reaction raw material therein but also inert to the polymerization reaction, examples thereof include hydrocarbon-based solvents, such as hexane, benzene, and toluene; and ether-based solvents, such as ethyl ether, 1,2-dimethoxyethane, and tetrahydrofuran.

After the polymerization reaction, in the case where the resulting polymer has an unsaturated bond, an acetal, and an aldehyde, in order to covert these into a saturated bond and an ether, it is preferred to further perform a hydrogenation treatment. The hydrogenation treatment can be performed in the presence of a hydrogenation catalyst at a reaction temperature of preferably 10° C. or higher and 250° C. or lower, and more preferably 50° C. or higher and 200° C. or lower while introducing a hydrogen gas preferably at a hydrogen pressure of 0.1 MPaG or more and 10 MPaG or lower, and more preferably at a hydrogen pressure of 1 MPaG or more and 6 MPaG or lower.

Examples of the hydrogenation catalyst include metal catalysts, such as a nickel-based catalyst, a platinum-based catalyst, a palladium-based catalyst, and a ruthenium-based catalyst, and catalysts having such a metal catalyst supported on alumina, diatomaceous earth, etc.; Raney-type catalysts; and the like can be used.

<Polyvinyl Ether-Based Compound (B)>

The polyvinyl ether-based compound (B) which is used in the refrigerator oil is a compound having a polyvinyl ether structure and contains a structural unit (b2) represented by the following general formula (2) (hereinafter also referred to simply as "component (B)"). The component (B) contains the structural unit (b2) in an amount of more than 50 mol % on a basis of 100 mol % of the whole amount of structural units excluding a terminal structural unit of the component (B) as mentioned later, in a molecular structure of the component (B).

In view of the fact that the refrigerator oil contains the component (B), the storage stability, in particular, the storage stability under a low-temperature environment is improved, and generation of cloudiness of the refrigerator oil at the time of storage is suppressed.

In the refrigerator oil, the component (B) may be contained alone, or may be contained in combination of two or more thereof.

(Structural Unit (b2))

The structural unit (b2) which the polyvinyl ether-based compound (B) contains in a molecular structure thereof is one having a hydrocarbon group other than a methoxy group in a side chain thereof and is one represented by the following general formula (2).

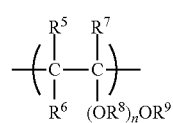

(2)

In the formula (2), $R^5$, $R^6$, and $R^7$ each independently represent a hydrogen atom or a hydrocarbon group having 1 or more and 8 or less carbon atoms; $R^8$ represents a divalent hydrocarbon group having 2 or more and 10 or less carbon atoms; n represents a number of 0 or more and 10 or less; and $R^9$ represents a hydrocarbon group having 2 or more and 10 or less carbon atoms.

In the general formula (2), examples of the hydrocarbon group having 1 or more and 8 or less carbon atoms, which may be selected as $R^5$ to $R^7$, respectively, include the same hydrocarbon groups as the hydrocarbon group having 1 or more and 8 or less carbon atoms, which may be selected as $R^1$ to $R^3$ in the general formula (1). In addition, suitable embodiments which may be selected as $R^5$ to $R^7$, respectively, are the same as the suitable embodiments which may be selected as $R^1$ to $R^3$ in the general formula (1).

Examples of the divalent hydrocarbon group having 2 or more and 10 or less carbon atoms, which may be selected as $R^8$, include the same hydrocarbon groups as the divalent hydrocarbon group having 2 or more and 10 or less carbon atoms, which may be selected as $R^4$ in the general formula (1). In addition, suitable embodiments which may be selected as $R^8$ are the same as the suitable embodiments which may be selected as $R^4$ in the general formula (1).

n represents a number of 0 or more and 10 or less, preferably 0 or more and 3 or less, more preferably 0 or more and 2 or less, still more preferably 0 or 1, and yet still more preferably 0. In the case where n is 0, the carbon atom with which $R^7$ is bound and the oxygen atom of $OR^9$ are bound with each other. In addition, in the case where n is 2 or more, plural $R^8$'s may be the same as or different from each other.

$R^9$ represents a hydrocarbon group having 2 or more and 10 or less carbon atoms. The carbon number which the hydrocarbon group having 2 or more and 10 or less carbon atoms and being capable of being selected as $R^9$ has is preferably 2 or more and 8 or less, more preferably 2 or more and 6 or less, still more preferably 2 or more and 4 or less, yet still more preferably 2 or 3, and even yet still more preferably 2.

Examples of the hydrocarbon group which may be selected as $R^9$ include hydrocarbon groups having 2 or more carbon atoms among the hydrocarbon groups as exemplified as the hydrocarbon group having 1 or more and 10 or less carbon atoms, which may be selected as $R^{15}$ in the aforementioned general formula (11-1). Above all, $R^9$ is preferably an alkyl group, more preferably an alkyl group having 2 or more and 4 or less carbon atoms, and still more preferably an ethyl group.

The component (B) may contain other structural unit than the structural unit (b2).

However, the content of the structural unit (b2) is more than 50 mol % and 100 mol % or less, preferably 60 mol % or more and 100 mol % or less, more preferably 70 mol % or more and 100 mol % or less, still more preferably 80 mol % or more and 100 mol % or less, and yet still more preferably 100 mol % on a basis of 100 mol % of the whole amount of the structural units excluding a terminal structural unit in a molecular structure terminal of the component (B) as mentioned later in a molecular structure of the component (B).

[Structural Unit (b2-1)]

The structural unit (b2) is preferably a structural unit (b2-1) represented by the following general formula (2-1).

In view of the fact that the component (B) contains the structural unit (b2-1), the storage stability of the resulting refrigerator oil, in particular, the storage stability under a low-temperature environment is more improved. In addition, the production of the component (B) becomes easy.

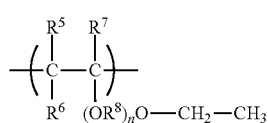

(2-1)

In the general formula (2-1), $R^5$, $R^6$, and $R^7$ each independently represent a hydrogen atom or a hydrocarbon group having 1 or more and 8 or less carbon atoms; $R^8$ represents a divalent hydrocarbon group having 2 or more and 10 or less carbon atoms; and n represents a number of 0 or more and 10 or less.

In the general formula (2-1), $R^5$, $R^6$, $R^7$, $R^8$, and n are the same as $R^5$, $R^6$, $R^7$, $R^8$, and n in the general formula (2) as mentioned above, and therefore, their explanations are omitted.

The content of the structural unit (b2-1) is preferably 50 mol % or more and 100 mol % or less, more preferably 70 mol % or more and 100 mol % or less, still more preferably 80 mol % or more and 100 mol % or less, and yet still more preferably 100 mol % on a basis of the whole amount (100 mol %) of the structural unit (b2) which is contained in the component (B).

[Structural Unit (b2-2)]

The structural unit (b2) is more preferably a structural unit (b2-2) represented by the following general formula (2-2).

In view of the fact that the component (B) contains the structural unit (b2-2), the storage stability of the resulting refrigerator oil, in particular, the storage stability under a low-temperature environment is still more improved. In addition, the production of the component (B) becomes easier.

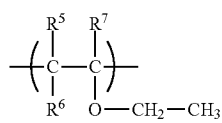

(2-2)

In the general formula (2-2), $R^5$, $R^6$, and $R^7$ each independently represent a hydrogen atom or a hydrocarbon group having 1 or more and 8 or less carbon atoms.

In the general formula (2-2), $R^5$, $R^6$, and $R^7$ are the same as $R^5$, $R^6$, and $R^7$ in the general formula (2) as mentioned above, and therefore, their explanations are omitted.

The content of the structural unit (b2-2) is preferably 50 mol % or more and 100 mol % or less, more preferably 70 mol % or more and 100 mol % or less, still more preferably 80 mol % or more and 100 mol % or less, and yet still more preferably 100 mol % on a basis of the whole amount (100 mol %) of the structural unit (b2) which is contained in the component (B).

[Structural Unit (b2-3)]

The structural unit (b2) is still more preferably a structural unit (b2-3) represented by the following general formula (2-3).

In view of the fact that the component (B) contains the structural unit (b2-3), the storage stability of the resulting refrigerator oil, in particular, the storage stability under a low-temperature environment is yet still more improved. In addition, the production of the component (B) becomes yet still easier.

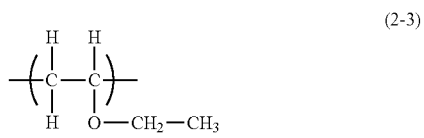

(2-3)

The content of the structural unit (b2-3) is preferably 50 mol % or more and 100 mol % or less, more preferably 70 mol % or more and 100 mol % or less, still more preferably 80 mol % or more and 100 mol % or less, and yet still more preferably 100 mol % on a basis of the whole amount (100 mol %) of the structural unit (b2) which is contained in the component (B).

(Structural Unit of Molecular Terminal of Polyvinyl Ether-Based Compound (B))

As the terminal moiety of the molecular structure of the polyvinyl ether-based compound (B), the same structural unit as the terminal moiety of the molecular structure of the component (A) as mentioned above is exemplified, and its suitable embodiment is also the same except for the following point, and therefore, the explanations thereof are omitted.

With respect to the terminal moiety of the molecular structure of the polyvinyl ether-based compound (B), as for suitable embodiments which may be selected as $R^{15}$, $R^{15a}$, $R^{15b}$, and $R^{17b}$, respectively, in the aforementioned general formulae (11-1), (11-2), (11-3), and (11-4), among those mentioned above, an alkyl group is preferred, an alkyl group having 1 or more and 4 or less carbon atoms is more preferred, and an ethyl group is still more preferred.

(Synthesis Method of Polyvinyl Ether-Based Compound (B))

A synthesis method of the polyvinyl ether-based compound (B) is not particularly limited, and there is exemplified a method in which using a raw material monomer capable of forming the structural unit (b2) and optionally, other raw material (for example, a raw material monomer capable of forming the structural unit (a1)), the synthesis is performed by various means of polymerization (e.g., radical polymerization, cationic polymerization, and radiation polymerization).

Examples of the raw material monomer capable of forming the structural unit (b2) include a vinyl ether-based monomer represented by the following general formula (II).

(II)

In the general formula (II), $R^5$, $R^6$, $R^7$, $R^8$, $R^9$, and n are the same as defined for $R^5$, $R^6$, $R^7$, $R^8$, $R^9$, and n in the general formula (2), and suitable embodiments thereof are also the same.

As for a synthesis method of the component (B), the same method as the synthesis method of the component (A) as mentioned above can be adopted, except for using, as the raw material monomer, the vinyl ether-based monomer represented by the general formula (II), and a suitable embodiment of each of conditions is also the same, and therefore, the explanation thereof is omitted.

In the refrigerator oil, a content ratio [(A)/(B)] of the component (A) and the component (B) is preferably 10/90 or more and 90/10 or less in terms of a mass ratio. When the content ratio [(A)/(B)] is satisfied with the foregoing range, the compatibility with a refrigerant and the storage stability of the resulting refrigerator oil can be more improved. From such a viewpoint, the content ratio [(A)/(B)] is more preferably 20/80 or more, still more preferably 35/65 or more, yet still more preferably 45/55 or more, and even yet still more preferably 55/45 or more, and it is more preferably 85/15 or less, still more preferably 80/20 or less, and yet still more preferably 75/25 or less, in terms of a mass ratio.

In the refrigerator oil, from the viewpoint of obtaining a refrigerator oil which is not only excellent in compatibility with a refrigerant but also favorable in storage stability, the total content of the component (A) and the component (B) is preferably 70.0% by mass or more, more preferably 75.0% by mass or more, still more preferably 80.0% by mass or more, yet still more preferably 85.0% by mass or more, and even yet still more preferably 90.0% by mass or more, and it is 100% by mass or less, preferably 99.7% by mass or less, more preferably 99.0% by mass or less, still more preferably 98.5% by mass or less, yet still more preferably 98.0% by mass or less, and even yet still more preferably 97.5% by mass or less, on a basis of the whole amount (100% by mass) of the refrigerator oil.

A kinematic viscosity at 40° C. of the mixture of the component (A) and the component (B) (hereinafter also referred to simply as "40° C. kinematic viscosity ") is preferably 1.0 mm$^2$/s or more, more preferably 10.0 mm$^2$/s or more, still more preferably 20.0 mm$^2$/s or more, yet still more preferably 30.0 mm$^2$/s or more, and even yet still more preferably 50.0 mm$^2$/s or more from the viewpoint that leakage of the resulting refrigerator oil from between members to be lubricated can be prevented from occurring. From the viewpoint of conservation of energy, the 40° C. kinematic viscosity of the mixture of the component (A) and the component (B) is preferably 90.0 mm$^2$/s or less, more preferably 80.0 mm$^2$/s or less, and still more preferably 75.0 mm$^2$/s or less.

A viscosity index (VI) of the mixture of the component (A) and the component (B) is preferably 55 or more, more preferably 60 or more, still more preferably 65 or more, and yet still more preferably 70 or more from the viewpoint of lubricity. Although its upper limit is not particularly limited, it is preferably 250 or less.

<Other Components>

The refrigerator oil may contain, in addition to the components (A) and (B), various additives, a mineral oil, and a synthetic oil other than the polyvinyl ether-based compounds (A) and (B) (hereinafter also referred to as "other synthetic oil"), as mentioned later.

(Additives)

The refrigerator oil may further contain, in addition to the components (A) and (B), one or more of any various additives, such as an antioxidant (C) (hereinafter also referred to simply as "component (C)"), an acid scavenger (D) (hereinafter also referred to simply as "component (D)"), an extreme pressure agent (E) (hereinafter also referred to simply as "component (E)"), an anti-foaming agent, an oily agent, an oxygen scavenger, a metal deactivator, and a rust inhibitor. Of these, at least one selected from the group consisting of an antioxidant (C), an acid scavenger (D), and an extreme pressure agent (E) is preferably contained.

In the case where the refrigerator oil contains the component (C) or the component (D), an increase of an acid number of the refrigerator oil under a high-temperature environment can be prevented from occurring, and thermal stability of the refrigerator oil can be improved, and hence, such is preferred. In addition, in the case where the refrigerator oil contains both the component (C) and the component (D), the increase of an acid number can be more suppressed, and the thermal stability of the refrigerator oil can be more improved, and hence, such is more preferred.

In the case where the refrigerator oil contains the component (E), wear resistance under a high-temperature environment becomes favorable, and lubricity can be more improved, and hence, such is preferred.

The antioxidant (C), the acid scavenger (D), the extreme pressure agent (E), and other additives are hereunder described in order.

(Antioxidant (C))

Examples of the antioxidant (C) include a phenol-based antioxidant and an amine-based antioxidant.

Examples of the phenol-based antioxidant include a monophenol-based antioxidant and a polyphenol-based antioxidant.

Examples of the monophenol-based antioxidant include alkyl-3-(3, 5-di-tert-butyl-4-hydroxyphenyl)propionates (examples of the alkyl group include those having 4 to 20 carbon atoms, and preferably 8 to 18 carbon atoms), such as n-octyl-3-(3,5-di-tert-butyl-4-hydroxyphenyl)propionate, 6-methylheptyl-3-(3,5-di-tert-butyl-4-hydroxyphenyl)propionate, and n-octadecyl-3-(3,5-di-tert-butyl-4-hydroxyphenyl)propionate; 2,6-di-tert-butyl-4-alkylphenols (the alkyl group has 1 or more and 4 or less carbon atoms), such as 2,6-di-tert-butyl-4-methylphenol and 2,6-di-tert-butyl-4-ethylphenol; 2,4-dimethyl-6-tert-butylphenol, and 2,6-di-tert-amyl-p-cresol.

Examples of the polyphenol-based antioxidant include 4,4'-methylenebis(2, 6-di-tert-butylphenol), 4,4'-bis(2,6-di-tert-butylphenol), 4,4'-bis(2-methyl-6-tert-butylphenol), 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-isopropylidenebis(2,6-di-tert-butylphenol), 2,2'-methylenebis(4-methyl-6-nonylphenol), 2,2'-isobutylidenebis(4,6-dimethylphenol), 2,2'-methylenebis(4-methyl-6-cyclohexylphenol), 4,4'-thiobis(2-methyl-6-tert-butylphenol), 4,4'-thiobis(3-methyl-6-tert-butylphenol), 2,2'-thiobis(4-methyl-6-tert-butylphenol), bis(3-methyl-4-hydroxy-5-tert-butylbenzyl)sulfide, bis(3,5-di-tert-butyl-4-hydroxybenzyl)sulfide, and thiodiethylenebis [3-(3,5-di-tert-butyl-4-hydroxyphenyl)propionate].

Examples of the amine-based antioxidant include dialkyl diphenylamines, such as 4,4'-dibutyl diphenylamine and 4,4'-dioctyl diphenylamine; phenyl-α-naphthylamines, such as an alkylphenyl-α-naphthylamine and phenyl-α-naphthylamine; and N,N' -diphenyl-p-phenylenediamine.

As the antioxidant (C), a phenol-based antioxidant is preferred from the viewpoints that an increase of an acid number of the resulting refrigerator oil is suppressed, and that oxidation stability at a high temperature is more easily improved. In addition, among those mentioned above, the phenol-based antioxidant is more preferably a 2,6-di-tert-butyl-4-alkylphenol, and still more preferably 2,6-di-tert-butyl-4-methylphenol.

The content of the component (C) in the refrigerator oil is preferably 0.1% by mass or more, more preferably 0.2% by mass or more, and still more preferably 0.3% by mass or more on a basis of the whole amount of the refrigerator oil from the viewpoints that an increase of an acid number of the resulting refrigerator oil is suppressed, and that oxidation stability at a high temperature is more easily improved. The foregoing content is preferably 5.0% by mass or less, more preferably 3.0% by mass or less, and still more preferably 1.0% by mass or less from the viewpoint of making it easy to exhibit an effect corresponding to the content.

The component (C) may be used alone, or may be used in combination of two or more thereof.

(Acid Scavenger (D))

Examples of the acid scavenger (D) include an epoxy compound. Examples of the epoxy compound include a glycidyl ether compound, cyclohexene oxide, an α-olefin oxide, and epoxidized soybean oil. Of these, a glycidyl ether compound is preferred.

Examples of the glycidyl ether compound include an aliphatic monoalcohol having preferably 3 or more and 30 or less carbon atoms, more preferably 4 or more and 24 or less carbon atoms, and still more preferably 6 or more and 16 or less carbon atoms; an aliphatic polyhydric alcohol having 3 or more and 30 or less carbon atoms, more preferably 4 or more and 24 or less carbon atoms, and still more preferably 6 or more and 16 or less carbon atoms; and an aromatic compound-derived glycidyl ether containing 1 or more hydroxy groups. Although the aliphatic monoalcohol or the aliphatic polyhydric alcohol may be linear, branched, or cyclic and may be saturated or unsaturated, it is preferably a saturated aliphatic monoalcohol.

In the case of an aliphatic polyhydric alcohol, or in the case of an aromatic compound containing two or more hydroxy groups, it is preferred that all of the hydroxy groups are glycidyl etherified from the viewpoints of stability of the refrigerator oil and suppression of an increase of a hydroxy value.

Examples of the glycidyl ether compound include phenyl glycidyl ether, an alkyl glycidyl ether, and an alkylene glycol glycidyl ether. Of these, a glycidyl ether derived from a linear, branched, or cyclic saturated aliphatic monoalcohol having 6 or more and 16 or less carbon atoms (namely, an alkyl glycidyl ether in which an alkyl group thereof has 6 or more and 16 or less carbon atoms) is more preferred from the viewpoints that an increase of an acid number of the resulting refrigerator oil is suppressed, and that oxidation stability at a high temperature is more easily improved. Examples of such a glycidyl ether include 2-ethylhexyl glycidyl ether, isononyl glycidyl ether, decyl glycidyl ether, lauryl glycidyl ether, and myristyl glycidyl ether, with 2-ethylhexyl glycidyl ether being still more preferred.

The content of the component (D) in the refrigerator oil is preferably 0.1% by mass or more, more preferably 0.4% by mass or more, still more preferably 0.8% by mass or more, and yet still more preferably 1.5% by mass or more on a basis of the whole amount of the refrigerator oil from the viewpoint of appropriately capturing an acid in the resulting refrigerator oil and effectively suppressing the increase of an acid number, thereby making it easier to improve the oxidation stability at a high temperature. The foregoing content is preferably 10.0% by mass or less, more preferably 5.0% by mass or less, still more preferably 3.0% by mass or less, and yet still more preferably 2.5% by mass or less from the viewpoint of making it easy to exhibit an effect corresponding to the content.

The component (D) may be used alone, or may be used in combination of two or more thereof.

As mentioned above, in view of the fact that the component (D) is used in combination with the component (C), the increase of an acid number of the resulting refrigerator oil can be more suppressed.

(Extreme Pressure Agent (E))

Examples of the extreme pressure agent (E) include a phosphorus-based extreme pressure agent. Examples of the phosphorus-based extreme pressure agent include a phosphoric acid ester, a phosphorous acid ester, an acidic phosphoric acid ester, an acidic phosphorous acid ester, and amine salts thereof.

Examples of the phosphoric acid ester include a triaryl phosphate, a trialkyl phosphate, a monoalkyl diaryl phosphate, a dialkyl monoaryl phosphate, and a trialkenyl phosphate. The "aryl" mentioned regarding the component (E) is a concept including not only a functional group composed of only an aromatic ring but also an alkylaryl and an arylalkyl.

Examples of the phosphoric acid ester include triaryl phosphates, such as triphenyl phosphate, tricresyl phosphate, benzyl diphenyl phosphate, cresyl diphenyl phosphate, dicresyl phenyl phosphate, propylphenyl diphenyl phosphate, dipropylphenyl phosphate, ethylphenyl diphenyl phosphate, diethylphenyl phenyl phosphate, triethylphenyl phosphate, tripropylphenyl phosphate, butylphenyl diphenyl phosphate, dibutylphenyl phenyl phosphate, and tributylphenyl phosphate; alkyl phosphates, such as tributyl phosphate, ethyldibutyl phosphate, trihexyl phosphate, tri (2-ethylhexyl) phosphate, tridecyl phosphate, trilauryl phosphate, trimyristyl phosphate, tripalmityl phosphate, and tristearyl phosphate; ethyl diphenyl phosphate, and trioleyl phosphate.

Examples of the acidic phosphoric acid include various alkyl acid phosphates and dialkyl acid phosphates.

Examples of the phosphorous acid ester include various trialkyl phosphites, triaryl phosphites, monoalkyl diaryl phosphites, dialkyl monoaryl phosphites, and trialkenyl phosphites.

Examples of the acidic phosphorous acid ester include various dialkyl hydrogen phosphites, dialkenyl hydrogen phosphites, and diaryl hydrogen phosphites.

The phosphorus-based extreme pressure agent may also be a sulfur atom-containing phosphoric acid ester, such as trithiophenyl phosphate, or the like. Examples of the amine salt include amine salts of an acidic phosphoric acid ester or an acidic phosphorous acid ester. The amine that forms the amine salt may be a primary, secondary, or tertiary amine.

Of those, the component (E) is preferably a phosphoric acid ester, and above all, it is more preferably a triaryl phosphate, and still more preferably tricresyl phosphate. In view of the fact that a triaryl phosphate, such as tricresyl phosphate, is used, lubricity of the resulting refrigerator oil at a high temperature, or the like readily becomes favorable. Examples of other preferred component (E) include trithiophenyl phosphate, tri(nonylphenyl) phosphite, dioleyl hydrogen phosphite, and 2-ethylhexyl diphenyl phosphite.

The content of the component (E) in the refrigerator oil is preferably 0.1% by mass or more, more preferably 0.3% by mass or more, still more preferably 0.5% by mass or more, and yet still more preferably 0.7% by mass or more on a basis of the whole amount of the refrigerator oil from the viewpoint of improving the wear resistance of the resulting refrigerator oil. The foregoing content is preferably 5.0% by mass or less, more preferably 3.0% by mass or less, still more preferably 2.5% by mass or less, and yet still more preferably 2.0% by mass or less from the viewpoint of making it easy to exhibit an effect corresponding to the content.

When the refrigerator oil contains the extreme pressure agent (E), the acid number tends to increase. However, by jointly using the antioxidant (C) and the acid scavenger (D), it is possible to improve the wear resistance while suppressing an increase of the acid number to be caused due to the extreme pressure agent (E).

In consequence, from the viewpoint of obtaining a refrigerator oil which is excellent in thermal stability and excellent in a balance with the wear resistance, a refrigerator oil containing all of the component (C), the component (D), and the component (E) is preferred.

The refrigerator oil may also be a refrigerator oil composed of only the component (A) and the component (B). In the case of a refrigerator oil containing these additives, a refrigerator oil composed of only the component (A) and the component (B) as well as at least one selected from the group consisting of the components (C) to (E) is preferred; a refrigerator oil composed of only the component (A) and the component (B) as well as at least two selected from the group consisting of the components (C) to (E) is more preferred; and a refrigerator oil composed of only the component (A) and the component (B) as well as the component (C), the component (D), and the component (E) is still more preferred.

In the case of a refrigerator oil containing all of the component (C), the component (D), and the component (E), a preferred content of each of the components (A) to (E) is the same as mentioned above. That is, the total content of the polyvinyl ether compound (A) and the polyvinyl ether compound (B), the content of the antioxidant (C), the content of the acid scavenger (D), and the content of the extreme pressure agent (E) are each preferably components (A) and (B) in total: 70% by mass or more and 99.7% by mass or less, component (C): 0.1% by mass or more and 5.0% by mass or less, component (D): 0.1% by mass or more and 10.0% by mass or less, and component (E): 0.1% by mass or more and 5.0% by mass or less, more preferably components (A) and (B) in total: 75% by mass or more and 99.0% by mass or less, component (C): 0.1% by mass or more and 3.0% by mass or less, component (D): 0.4% by mass or more and 5.0% by mass or less, and component (E): 0.3% by mass or more and 3.0% by mass or less, still more preferably components (A) and (B) in total: 80% by mass or more and 98.0% by mass or less, component (C): 0.2% by mass or more and 1.0% by mass or less, component (D): 0.8% by mass or more and 3.0% by mass or less, and component (E): 0.5% by mass or more and 2.5% by mass or less, and yet still more preferably components (A) and (B) in total: 85% by mass or more and 97.5% by mass or less, component (C): 0.3% by mass or more and 1.0% by mass or less, component (D): 1.5% by mass or more and 2.5% by mass or less, and component (E): 0.7% by mass or more and 2.0% by mass or less, on a basis of the whole amount of the refrigerator oil.

In the case where the refrigerator oil contains the components (C) to (E), preferred compounds of each of the components (C) to (E) are the same as mentioned above.

That is, it is preferred that the antioxidant (C) is a phenol-based antioxidant, the acid scavenger (D) is a glycidyl ether compound, and the extreme pressure agent (E) is a phosphoric acid ester; it is more preferred that the antioxidant (C) is a 2,6-di-tert-butyl-4-alkylphenol, the acid scavenger (D) is an alkyl glycidyl ether, and the extreme pressure agent (E) is a triaryl phosphate; and it is still more preferred that the antioxidant (C) is 2,6-di-tert-butyl-4-methylphenol, the acid scavenger (D) is 2-ethylhexyl glycidyl ether, and the extreme pressure agent (E) is tricresyl phosphate.

[Other Additives]

The refrigerator oil may further contain, as additives, other additives than the components (C) to (E).

Examples of the other additive include an oxygen scavenger, an oiliness improver, a copper deactivator, a rust inhibitor, and an anti-foaming agent. These additives may be used alone, or may be used in combination of two or more thereof.

Examples of the oxygen scavenger include sulfur-containing aromatic compounds, such as 4,4'-thiobis(3-methyl-6-tert-butylphenol), diphenyl sulfide, dioctyl diphenyl sulfide, a dialkyl diphenylene sulfide, benzothiophene, dibenzothiophene, phenothiazine, benzothiapyran, thiapyran, thianthrene, dibenzothiapyran, and diphenylene disulfide; aliphatic unsaturated compounds, such as various olefins, dienes, and trienes; and terpenes having a double bond in a molecular structure thereof.

Examples of the oiliness improver include aliphatic saturated or unsaturated monocarboxylic acids, such as stearic acid and oleic acid; polymerized fatty acids, such as a dimer acid and a hydrogenated dimer acid; hydroxy fatty acids, such as ricinoleic acid and 12-hydroxystearic acid; aliphatic saturated or unsaturated monoalcohols, such as lauryl alcohol and oleyl alcohol; aliphatic saturated or unsaturated monoamines, such as stearylamine and oleylamine; aliphatic saturated or unsaturated monocarboxylic acid amides, such as lauric acid amide and oleic acid amide; and partial esters between a polyhydric alcohol, such as glycerin and sorbitol, and an aliphatic saturated or unsaturated monocarboxylic acid.

Examples of the copper deactivator include an N-[N,N'-dialkyl (alkyl group having 3 or more and 12 carbon atoms) aminomethyl]triazole.

Examples of the rust inhibitor include a metal sulfonate, an aliphatic amine, an organic sulfonic acid metal salt, an organic phosphoric acid metal salt, an alkenyl succinic acid ester, and a polyhydric alcohol ester.

Examples of the anti-foaming agent include silicone oils, such as dimethyl polysiloxane, and polymethacrylates.

In the case where the refrigerator oil contains such other additive, the content of each of the other additives is preferably 0.01% by mass or more and 10% by mass or less, and more preferably 0.05% by mass or more and 5% by mass or less on a basis of the whole amount (100% by mass) of the refrigerator oil.

(Mineral Oil and Other Synthetic Oil)

The refrigerator oil may contain various mineral oils; and synthetic oils other than the polyvinyl ether-based compounds (A) and (B) (hereinafter also referred to as "other synthetic oils") within a range where the effects of the present invention are not impaired.

Examples of the mineral oil include refined oils obtained by subjecting lubricating oil fractions obtained by atmospherically distilling a paraffinic, intermediate base, or naphthenic crude oil, or vacuum-distilling an atmospheric residual oil obtained by atmospherically distilling crude oil, to at least one of solvent deasphaltation, solvent extraction, hydrocracking, solvent dewaxing, catalytic dewaxing, and hydrorefining; oils produced by isomerizing a mineral oil-based wax; and oils produced by isomerizing GTL WAX (gas-to-liquid) which is produced by the Fischer-Tropsch process, or the like.

Examples of the other synthetic oil include synthetic oils, such as a polyvinyl ether-based compound not containing the structural units (a1) and (b2), a polyalkylene glycol-based compound, a copolymer of a poly(oxy)alkylene glycol or a monoether thereof and a polyvinyl ether not containing the structural units (a1) and (b2), and a polyol ester-based compound.

The mineral oil and other synthetic oil may be used either alone or in combination of two or more thereof.

As for the mineral oil and the other synthetic oil, ones having the same 40° C. kinematic viscosity as the mixture of the polyvinyl ether-based compounds (A) and (B) may be used. The foregoing 40° C. kinematic viscosity is preferably 1.0 mm²/s or more, more preferably 10.0 mm²/s or more, still more preferably 20.0 mm²/s or more, yet still more preferably 30.0 mm²/s or more, and even yet still more preferably 50.0 mm²/s or more. It is preferably 90.0 mm²/s or less, more preferably 80.0 mm²/s or less, and still more preferably 75.0 mm²/s or less.

The content of each of the mineral oil and the other synthetic oil is preferably 0 part by mass or more and 30 parts by mass or less, more preferably 0 part by mass or more and 20 parts by mass or less, still more preferably 0 part by mass or more and 10 parts by mass or less, and yet still more preferably 0 part by mass or more and 3 parts by mass or less based on 100 parts by mass of the total content of the component (A) and the component (B) from the viewpoint of providing a refrigerator oil with excellent compatibility with a refrigerant.

<Characteristics of Refrigerator Oil>

The refrigerator oil is excellent in compatibility with a refrigerant under any of a high-temperature environment and a low-temperature environment.

A two-layer separation temperature at the high-temperature side of the refrigerator oil from the refrigerant is preferably 45° C. or higher, more preferably 50° C. or higher, still more preferably 55° C. or higher, and yet still more preferably 60° C. or higher.

A two-layer separation temperature at the low-temperature side of the refrigerator oil from the refrigerant is preferably −5° C. or lower, more preferably −10° C. or lower, still more preferably −20° C. or lower, yet still more preferably −40° C. or lower, and even yet still more preferably −45° C. or lower.

In this specification, the foregoing "two-layer separation temperature at the high-temperature side of the refrigerator oil from the refrigerant" and "two-layer separation temperature at the low-temperature side of the refrigerator oil from the refrigerant" each mean a value measured by the method described in the section of Examples as mentioned later.

An acid number of the refrigerator oil as measured by the method described in the section of Examples as mentioned later is preferably 1.50 or less, more preferably 1.10 or less, still more preferably 0.80 or less, yet still more preferably 0.60 or less, even yet still more preferably 0.30 or less, and even still more preferably 0.10 or less from the viewpoint of improving the thermal stability.

A value of ring wear amount on the occasion of using the refrigerator oil as measured by the method described in the section of Examples as mentioned later is preferably 2.0 or less, more preferably 1.5 or less, still more preferably 1.0 or less, yet still more preferably 0.8 or less, even yet still more preferably 0.7 or less, and even still more preferably 0.6 or less from the viewpoint of improving the lubricity.

[Production Method of Refrigerator Oil]

A production method of the refrigerator oil according to one embodiment of the present invention is a method of producing a refrigerator oil including blending at least, as a component (A), a polyvinyl ether-based compound (A) containing a structural unit (a1) having a methoxy group in a side chain thereof and, as a component (B), a polyvinyl ether-based compound (B) containing a structural unit (b1) represented by the following general formula (2).

In the general formula (2), $R^5$, $R^6$, and $R^7$ each independently represent a hydrogen atom or a hydrocarbon group having 1 or more and 8 or less carbon atoms; $R^8$ represents a divalent hydrocarbon group having 2 or more and 10 or less carbon atoms; n represents a number of 0 or more and 10 or less; and $R^9$ represents a hydrocarbon group having 2 or more and 10 or less carbon atoms.

In the foregoing production method, in addition to the component (A) and the component (B), at least one selected from the group consisting of the component (C), the component (D), and the component (E) may be blended, and the aforementioned other additives may be further blended. In addition, an oil other than the component (A) and the component (B) may be blended.

The detailed explanations regarding the component (A) and the component (B) as well as the components (C) to (E), the other additives, and the oil other than the component (A) and the component (B) are the same as those mentioned above, and therefore, their explanations are omitted.

[Refrigerator Oil Composition]

The refrigerator oil is one to be used with a refrigerant upon being mixed. In this specification, a mixture of the refrigerator oil and the refrigerant is referred to as "refrigerator oil composition".

The refrigerator oil composition according to one embodiment of the present invention contains a refrigerant and the aforementioned refrigerator oil.

<Refrigerant>

As the refrigerant, there is exemplified at least one selected from the group consisting of a fluorinated hydrocarbon, a hydrocarbon-based refrigerant that is a natural refrigerant, carbon dioxide, and ammonia.

A content ratio of the refrigerator oil and the refrigerant ((refrigerator oil)/(refrigerant)) in the refrigerator oil composition is preferably 1/99 or more and 99/1 or less, more preferably 1/99 or more and 90/10 or less, still more preferably 5/95 or more and 70/30 or less, and yet still more preferably 5/95 or more and 60/40 or less in terms of a mass ratio. By allowing the foregoing mass ratio of the refrigerator oil and the refrigerant to fall within the foregoing range, it is possible to obtain lubricity and suitable refrigerating capacity in a refrigerator.

(Fluorinated Hydrocarbon)

As the fluorinated hydrocarbon refrigerant, there is exemplified at least one selected from the group consisting of a saturated fluorinated hydrocarbon compound (HFC) and an unsaturated fluorinated hydrocarbon compound (HFO).

The saturated fluorinated hydrocarbon compound (HFC) is preferably a fluoride of an alkane having 1 or more and 4 or less carbon atoms, more preferably a fluoride of an alkane having 1 or more and 3 or less carbon atoms, and still more preferably a fluoride of an alkane having 1 or 2 carbon atoms (methane or ethane). Examples of the fluoride of methane or ethane include trifluoromethane (R23), difluoromethane (R32), 1,1-difluoroethane (R152a), 1,1,1-trifluoroethane (R143a ), 1,1,2-trifluoroethane (R143), 1,1,1,2-tetrafluoroethane (R134a), 1,1,2,2-tetrafluoroethane (R134), and 1,1,1,2,2-pentafluoroethane (R125). Of these, at least one selected from the group consisting of R32, R134a, and R125 is preferred; R32 and at least one selected from the group consisting of R134a and R125 are more preferred; and R32 is still more preferred.

These saturated fluorinated hydrocarbon compounds may be used alone, or may be used in combination of two or more thereof. Here, in the case of using a combination of two or more of the saturated fluorinated hydrocarbon compounds, examples thereof include a mixed refrigerant resulting from mixing of two or more saturated fluorinated hydrocarbon compounds having 1 or more and 3 or less carbon atoms; and a mixed refrigerant resulting from mixing of two or more saturated fluorinated hydrocarbon compounds having 1 or more and 2 or less carbon atoms.

Examples of the mixed refrigerant include a mixture of R32 and R125 (R410A); a mixture of R125, R143a , and R134a (R404A); a mixture of R32, R125, and R134a (e.g., R407A , R407C, and R407E); and a mixture of R125 and R143a (R507A). The mixed refrigerant resulting from mixing of these two or more refrigerants is preferably at least one selected from the group consisting of a mixture of R32, R125, and R134a, such as R407A , R407C, and R407E; and a mixture of R32 and R125, such as R410A.

Examples of the unsaturated fluorinated hydrocarbon compound (HFO) include compounds having a carbon-carbon double bond, such as fluorides of a linear or branched chain olefin having 2 or more and 6 or less carbon atoms; and a cyclic olefin having 4 or more and 6 or less carbon atoms.

More specifically, examples thereof include an ethylene having 1 or more and 3 or less fluorine atoms introduced thereinto; a propene having 1 or more and 5 or less fluorine atoms introduced thereinto; a butene having 1 or more and 7 or less fluorine atoms introduced thereinto; a pentene having 1 or more and 9 or less fluorine atoms introduced thereinto; a hexene having 1 or more and 11 or less fluorine atoms introduced thereinto; a cyclobutene having 1 or more and 5 or less fluorine atoms introduced thereinto; a cyclopentene having 1 or more and 7 or less fluorine atoms introduced thereinto; and a cyclohexene having 1 or more and 9 or less fluorine atoms introduced thereinto.

Of these unsaturated fluorinated hydrocarbon compounds, a fluoride of a propene is preferred; a propene having 3 or more and 5 or less fluorine atoms introduced thereinto is more preferred; and a propene having 4 fluorine atoms introduced thereinto is still more preferred. As for other fluorides than the fluoride of a propene, a fluoride of ethylene is preferred; an ethylene having 1 or more and 3 or less fluorine atoms introduced thereinto is more preferred; and ethylene having 3 fluorine atoms introduced thereinto is still more preferred.

Suitable examples of the unsaturated fluorinated hydrocarbon refrigerant include 1,2,3,3,3-pentafluoropropene (R1225ye), 2,3,3,3-tetrafluoropropene (R1234yf), 1,3,3,3-tetrafluoropropene (R1234ze), 1,2,3,3-tetrafluoropropene (R1234yz), 1,1,2-trifluoroethylene (R1123), and (Z)-1,1,1,4,4,4-hexafluoro-2-butene (R1336mzz(Z)). Of these, at least one selected from the group consisting of R1234yf, R1234ze, R1123, and R1336mzz (Z) is preferred.

These unsaturated fluorinated hydrocarbon compounds may be used alone, or may be used in combination of two or more thereof, and may also be used in combination with other refrigerant than the unsaturated fluorinated hydrocarbon compound. Here, as for an example of the case of using the unsaturated fluorinated hydrocarbon compound in combination with other refrigerant than the unsaturated fluorinated hydrocarbon compound, a mixed refrigerant of a saturated fluorinated hydrocarbon compound and an unsaturated fluorinated hydrocarbon compound is exemplified, and a mixed refrigerant with R32 is preferably exemplified. Examples of the mixed refrigerant include a mixed refrigerant of R32 and R1234yf; a mixed refrigerant of R32 and R1123; a mixed refrigerant of R32, R1234ze, and R152a; a mixed refrigerant of R32, R125, and R1234yf; a mixed refrigerant of R32, R125, R1234yf, and R134a; a mixed refrigerant of R32, R125, R1234yf, R1234ze, and R134a; and a mixed refrigerant of R32, R125, R1234yf, and R1234ze.

(Natural Refrigerant)

As the natural refrigerant, at least one selected from the group consisting of a hydrocarbon-based refrigerant, carbon dioxide (carbonic acid gas), and ammonia is exemplified, with a hydrocarbon-based refrigerant being preferred. These may be used alone, or may be used in combination of two or more thereof, or may be combined with other refrigerant than the natural refrigerant. Here, as an example of the case using a combination with other refrigerant than the natural refrigerant, a mixed refrigerant with at least one selected from the group consisting of a saturated fluorinated hydrocarbon compound and an unsaturated fluorinated hydrocarbon compound is exemplified. Specific examples of the mixed refrigerant include a mixed refrigerant of carbon dioxide, HFO1234ze, and R134a (AC6, mixing ratio: 5.15/79.02/15.41).

The hydrocarbon-based refrigerant is preferably a hydrocarbon having 1 or more and 8 or less carbon atoms, more preferably a hydrocarbon having 1 or more and 5 or less carbon atoms, and still more preferably a hydrocarbon having 3 or more and 5 or less carbon atoms. When the carbon number is 8 or less, the boiling point of the refrigerant does not become excessively high, and hence, such is preferred as the refrigerant. As the hydrocarbon-based refrigerant, at least one selected from the group consisting of methane, ethane, ethylene, propane (R290), cyclopropane, propylene, n-butane, isobutane (R600a), 2-methylbutane, n-pentane, isopentane, and cyclopentane/isobutane is exemplified, and these may be used alone, or may be used in combination of two or more thereof. In addition, as the hydrocarbon-based refrigerant, only the aforementioned hydrocarbon may be used, or as mentioned above, it can also be used a mixed refrigerant resulting from mixing of a fluorinated hydrocarbon, such as R32 and R134a, or other refrigerant than the fluorinated hydrocarbon-based refrigerant, such as ammonia and carbon dioxide.

Of these, the natural refrigerant is preferably at least one selected from the group consisting of a hydrocarbon-based refrigerant, carbon dioxide, and ammonia, more preferably a hydrocarbon-based refrigerant, and still more preferably propane (R290) or isobutane (R600a).

Such a natural refrigerant may also be used in combination with the aforementioned fluorinated hydrocarbon refrigerant.

The refrigerator oil that is one embodiment of the present invention is excellent in compatibility with the refrigerant over a wide temperature range of from a low temperature to a high temperature, and therefore, the refrigerant is preferably a refrigerant containing difluoromethane (R32).

The refrigerant containing difluoromethane (R32) is more preferably R32 alone or a mixture of R32 and at least one refrigerant selected from the group consisting of a fluorinated hydrocarbon refrigerant other than R32, a hydrocarbon refrigerant, carbon dioxide, and ammonia, and still more preferably R32 alone. The refrigerant other than R32, which can be used in combination with R32, may be used alone or in combination of two or more thereof.

In the case of using, as the refrigerant, a refrigerant containing difluoromethane (R32), the content of R32 in the refrigerant containing difluoromethane (R32) is preferably 10% by mass or more and 100% by mass or less, more preferably 20% by mass or more and 100% by mass or less, still more preferably 30% by mass or more and 100% by mass or less, yet still more preferably 50% by mass or more and 100% by mass or less, and even yet still more preferably 70% by mass or more and 100% by mass or less on a basis of the whole amount (100% by mass) of the refrigerant. Above all, the refrigerant of R32 alone (100% by mass) is even still more preferred. That is, the aforementioned refrigerator oil can be suitably used as a refrigerator oil for refrigerant containing R32, and can be more suitably used as a refrigerator oil for R32 refrigerant.

[Refrigerator]

The aforementioned refrigerator oil or refrigerator oil composition is filled in the interior of the refrigerator and used.

The refrigerator is preferably a compression-type refrigerator, and more preferably one having a refrigeration cycle including a compressor, a condenser, an expansion mechanism (e.g., an expansion valve), and an evaporator, or having a refrigeration cycle including a compressor, a condenser, an expansion mechanism, a dryer, and an evaporator.

The refrigerator is, for example, used for lubricating a sliding portion to be provided in a compressor, etc.

Although the sliding portion is not particularly limited, it is preferred that any of the sliding portions contains a metal, such as iron, and it is preferably one to slide between a metal and a metal.

Although the refrigerator is applied to, for example, a car air conditioner, such as an open-type car air conditioner and an electric car air conditioner, an air conditioner, a gas heat pump (GHP), a refrigeration system, such as a freezer, an icebox, a vending machine, and showcase, a hot water system, such as a water heater and a floor heater, and a heating system, it is preferably applied to an air conditioning application.

EXAMPLES

The present invention is hereunder more specifically described by reference to Examples, but it should be construed that the present invention is by no means limited by these Examples.

Respective physical properties of each component, each refrigerator oil, and each refrigerator oil composition were determined in the following way.

[40° C. Kinematic Viscosity]

A 40° C. kinematic viscosity was measured in conformity with JIS K2283:2000.

[Viscosity Index (VI)]

A kinematic viscosity at each of 40° C. and 100° C. was measured in conformity with JIS K2283:2000, and a viscosity index (VI) was calculated.

[Compatibility Between Refrigerant and Refrigerator Oil]

A refrigerator oil composition containing 15% by mass of a refrigerator oil and 85% by mass of a refrigerant on a basis of the whole amount of the refrigerator oil composition [refrigerator oil composition of (refrigerator oil)/(refrigerant)=15/85 (mass ratio)] was prepared. Difluoromethane (R32) was used as the refrigerant.

Using the resulting refrigerator oil composition, a two-layer separation temperature at each of the low-temperature side and the high-temperature side was measured by the following method.

<Two-Layer Separation Temperature at the High-Temperature Side>

The resulting refrigerator oil composition was charged in a pressure-resistant glass ampule, and the ampule was connected to a vacuum pipe and a refrigerant pipe and then subjected to vacuum deaeration at room temperature (25° C.). Thereafter, the ampule was cooled with liquefied nitrogen, and a predetermined amount of a refrigerant was collected in the ampule via the refrigerant pipe, followed by sealing the ampule, thereby preparing an ampule having a measurement sample enclosed therein.

Thereafter, the ampule was held in a thermostat; the ampule was irradiated with a laser; the temperature of the thermostat was raised from room temperature (25° C.) to 70° C. at a rate of 1° C./min while measuring a light transmittance of the ampule; and a temperature of the thermostat when the light transmittance of the ampule became 50% of the light transmittance of the ampule at room temperature was designated as a two-layer separation temperature at the high-temperature side of the refrigerator oil as a measurement object from the refrigerant. It is indicated that the higher the two-layer separation temperature at the high-temperature side of the refrigerator oil, the more excellent the compatibility with a refrigerant at a high temperature.

A refrigerator oil composition which did not cause the two-layer separation until at 70° C. is expressed as "70<" in the following Table 1.

<Two-Layer Separation Temperature at the Low-Temperature Side>

A two-layer separation temperature at the low-temperature side was measured adopting the same method as the measurement method of the two-layer separation temperature at the high-temperature side, except that at the time of measurement, the ampule was cooled from room temperature at a rate of −1° C./min. It is indicated that the lower the two-layer separation temperature at the low-temperature side of the refrigerator oil, the more excellent the compatibility with a refrigerant at a low temperature.

A refrigerator oil composition which did not cause the two-layer separation until at −50° C. is expressed as "−50>" in the following Table 1.

[Storage Stability Test]

A refrigerator oil obtained in each of Examples and each of Comparative Examples was stored in a 0.1-liter volume glass-made vessel and allowed to stand at −5° C. for 30 days, followed by observing an appearance thereof.

The obtained results are shown in Table 1.

Various descriptions in the table are as follows, in which "A" indicates that in the case of "transparent", the storage stability is excellent, and "D" indicates that in the case of "separated", the storage stability is inferior.

A: The state of "transparent", expressing the state in which the component (B) is uniformly dissolved in the component (A), and the oil is "transparent".

B: The state of "slightly cloudy", expressing the state in which while the dissolution of the component (B) is more advanced than the state of "cloudy", the oil is extremely slightly opaque.

C: The state of "cloudy", expressing the state in which while the component (B) is dissolved in the component (A), a part of the component (B) is dispersed in the component (A), whereby the oil becomes slightly opaque.

D: The state of "separated", expressing the state in which the component (B) is not dissolved in the component (A), so that light-liquid separation is caused.

[Thermal Stability Test: Autoclave Test]

The chemical stability between the refrigerator oil and the refrigerant was evaluated in conformity with the method described in Appendix C of JIS K2211:2009.

A stainless steel-made pressure-resistant vessel was charged with, as catalysts, iron (Fe), copper (Cu), and aluminum (Al) [all having a diameter of 1.6 mm and a length of 300 mm] and sealed together with 30 g of the refrigerator oil and, as a refrigerant, 30 g of difluoromethane (R32) ((refrigerator oil)/(refrigerant) =30/30 (mass ratio), moisture content in the oil: 500 ppm by mass). Subsequently, the sealed pressure-resistant vessel was heated at 175° C. for 336 hours, and the acid number of the refrigerator oil was then measured in conformity with the indicator titration method as prescribed in JIS K2501:2003.

The obtained results are shown in Table 2.

[Lubricity Test (Measurement of Ring Wear Amount)]

Using a sealed block-on-ring friction tester (LFW-1), a ring wear amount during using each refrigerator oil was measured under a difluoromethane (R32) refrigerant environment under the following condition.

The obtained results are shown in Table 3.

Ring: FC250, block: SKH51

Rotation rate: 1,000 r/min, oil temperature: 80° C., refrigerant pressure: 0.4 MPa During the running-in operation; load: 300 N, operation time: 1 minute During the test; load: 500 N, operation time: 60 minutes

[Preparation Example: Preparation of Hydrogenation Catalyst]

A 2-liter volume SUS316L-made autoclave was charged with 6 g of a nickel diatomaceous earth catalyst (a trade name: "N113", manufactured by JGC Catalysts and Chemicals Ltd.) and 300 g of isooctane. The autoclave was purged with nitrogen and subsequently purged with hydrogen. Thereafter, the temperature was raised while setting a hydrogen pressure to 3.0 MPaG, and the autoclave was kept at 140° C. for 30 minutes and then cooled to room temperature.

After purging the autoclave with nitrogen, 10 g of acetaldehyde diethyl acetal was added in the autoclave. The autoclave was again purged with nitrogen and subsequently purged with hydrogen. The temperature was then raised to 130° C. while setting a hydrogen pressure to 3.0 MPaG, and the autoclave was kept at 130° C. for 30 minutes. On the occasion of performing this operation, the pressure within the autoclave was increased due to temperature rise, whereas the acetaldehyde diethyl acetal reacted, whereby a reduction of the hydrogen pressure was perceived. In the case where the hydrogen pressure was reduced and reached to 3.0 MPaG or less, hydrogen was injected into the autoclave, to regulate the hydrogen pressure such that it was kept at 3.0 MPaG. Thereafter, the autoclave was cooled to room temperature and then subjected to depressurization. Subsequently, the autoclave was purged with nitrogen at atmospheric pressure, followed by deaeration.

[Synthesis Example 1: Synthesis of Polyvinyl Ether-Based Compound (A)]

A 1-liter glass-made flask installed with a stirrer was charged with 133 g of toluene, 33.6 g of methanol as an initiator, and 0.2 g of a boron trifluoride diethyl ether complex. In addition, an Erlenmeyer flask which had been prepared separately from the aforementioned 1-liter glass-made flask was charged with 500 g of methyl vinyl ether as a raw material monomer. The aforementioned methyl vinyl ether was supplied at 5 mL/min with a pump while stirring the inside of the 1-liter glass-made flask, and when 54 g of the methyl vinyl ether was supplied, the pump was once stopped. After confirming that the temperature within the 1-liter glass-made flask was raised due to the reaction, the pump was rebooted, and the rest of the methyl vinyl ether was supplied over 4 hours. During supply of the methyl vinyl ether, the temperature was controlled with a water bath such that the temperature within the 1-liter glass-made flask was 25° C. After completion of supply of the entirety of methyl vinyl ether, the stirring was further performed for 5 minutes.

Subsequently, in the 1-liter glass-made flask, 10 g (mass ratio to a sum total of the initiator and the raw material monomer: 0.019) of hydrotalcite (a trade name: "KYO-WAAD (registered trademark) 500SH", manufactured by Kyowa Chemical Industry Co., Ltd., a proportion of particles having a particle diameter of 500 μm or less: 100%, a proportion of particles having a particle diameter of 106 μm or less: 94%, a proportion of particles having a particle diameter of 45 to 106 μm: 56%) was added as an adsorbent and stirred at 25° C. for 1 hour, thereby adsorbing the boron trifluoride diethyl ether complex thereonto. Subsequently, the solution within the 1-liter glass-made flask was filtered to remove the adsorbent, and the solvent and the light component were removed with a rotary evaporator, to obtain a crude product Aa.

The 2-liter volume SUS316L-made autoclave in which the hydrogenation catalyst prepared in the Preparation Example had been charged was charged with 120 g of the crude product Aa and 300 g of isooctane. After purging the autoclave with hydrogen, the hydrogen pressure was kept at 3.5 MPaG, the temperature was raised to 140° C. with stirring over 30 minutes, and the contents were further allowed to react with each other for 3 hours while keeping at 140° C. After completion of the reaction, the resultant was cooled to room temperature, and the pressure was reduced to atmospheric pressure. Filtration with a filter paper was performed, to remove the hydrogenation catalyst. The solvent, the moisture, and so on were removed under reduced pressure with a rotary evaporator, to obtain a polyvinyl ether-based compound (A).

The resulting polyvinyl ether-based compound (A) was one containing 100 mol % of the structural unit (a1-2) having a methoxy group, as represented by the general formula (1-2), on a basis of 100 mol % of the whole amount of structural units excluding terminal structural units.

One of the terminal structural units is the structural unit (a11-1) represented by the general formula (11-1), and in the general formula (11-1), $R^{11}$, $R^{12}$, and $R^{13}$ are each a hydrogen atom, $R^{15}$ is a methyl group, and p1 is 0.

Furthermore, the other terminal structural unit is the structural unit (a11-2) represented by the general formula (11-2), and in the general formula (11-2), $R^{11a}$, $R^{12a}$, and $R^{13a}$ are each a hydrogen atom, $R^{15a}$ is a methyl group, and p2 is 0.

[Synthesis Example 2: Synthesis of Polyvinyl Ether-Based Compound (B)]

A 1-liter glass-made flask installed with a stirrer was charged with 106 g of toluene, 24.3 g of ethanol as an initiator, and 0.2 g of a boron trifluoride diethyl ether complex. In addition, an Erlenmeyer flask which had been prepared separately from the aforementioned 1-liter glass-made flask was charged with 400 g of ethyl vinyl ether as a raw material monomer. The aforementioned ethyl vinyl ether was supplied at 5 mL/min with a pump while stirring the inside of the 1-liter glass-made flask, and when 45.7 g of the ethyl vinyl ether was supplied, the pump was once stopped. After confirming that the temperature within the 1-liter glass-made flask was raised due to the reaction, the pump was rebooted, and the rest of the ethyl vinyl ether was supplied over 4 hours. During supply of the ethyl vinyl ether, the temperature was controlled with a water bath such that the temperature within the 1-liter glass-made flask was 25° C. After completion of supply of the entirety of ethyl vinyl ether, the stirring was further performed for 5 minutes.

Subsequently, in the 1-liter glass-made flask, 10 g (mass ratio to a sum total of the initiator and the raw material monomer: 0.019) of hydrotalcite (a trade name: "KYO-WAAD (registered trademark) 500SH", manufactured by Kyowa Chemical Industry Co., Ltd., a proportion of particles having a particle diameter of 500 μm or less: 100%, a proportion of particles having a particle diameter of 106 μm or less: 94%, a proportion of particles having a particle diameter of 45 to 106 μm: 56%) was added as an adsorbent and stirred at 25° C. for 1 hour, thereby adsorbing the boron trifluoride diethyl ether complex thereonto. Subsequently, the resultant was subjected to filtration to remove the adsorbent, and the solvent and the light component were removed with a rotary evaporator, to obtain a crude product Bb.

The 2-liter volume SUS316L-made autoclave in which the hydrogenation catalyst prepared in the Preparation Example had been charged was charged with 120 g of the crude product Bb and 300 g of isooctane. After purging the autoclave with hydrogen, the hydrogen pressure was kept at 3.5 MPaG, the temperature was raised to 140° C. with stirring over 30 minutes, and the contents were further allowed to react with each other for 3 hours while keeping at 140° C. After completion of the reaction, the resultant was cooled to room temperature, and the pressure was reduced to atmospheric pressure. Filtration with a filter paper was performed, to remove the hydrogenation catalyst. The solvent, the moisture, and so on were removed under reduced pressure with a rotary evaporator, to obtain a polyvinyl ether-based compound (B).

The resulting polyvinyl ether-based compound (B) was one containing 100 mol % of the structural unit (b2-3) having an ethoxy group, as represented by the general formula (2-3), on a basis of 100 mol % of the whole amount of structural units excluding terminal structural units.

One of the terminal structural units is the structural unit (a11-1) represented by the general formula (11-1), and in the general formula (11-1), $R^{11}$, $R^{12}$, and $R^{13}$ are each a hydrogen atom, $R^{15}$ is an ethyl group, and p1 is 0.

Furthermore, the other terminal structural unit is the structural unit (a11-2) represented by the general formula (11-2), and in the general formula (11-2), $R^{11a}$, $R^{12a}$, and $R^{13a}$ are each a hydrogen atom, $R^{15a}$ is an ethyl group, and p2 is 0.

[Examples 1 to 16 and Comparative Examples 1 to 3]

Respective components shown in the following Tables 1 to 3 were blended to prepare refrigerator oils of respective Examples and respective Comparative Examples, which were then evaluated according to the aforementioned evaluation methods. The obtained results are shown in the following Tables 1 to 3.

The respective components shown in the following Tables 1 to 3 express the following compounds, respectively.

Component (A): PVE (A) [the polyvinyl ether-based compound (A) synthesized in Synthesis Example 1]
Component (B): PVE (B) [the polyvinyl ether-based compound (B) synthesized in Synthesis Example 2]
Component (C): Antioxidant [2,6-di-tert-butyl-4-methylphenol]
Component (D): Acid scavenger [2-ethylhexyl glycidyl ether]
Component (E): Extreme pressure agent [tricresyl phosphate]

TABLE 1

|  |  |  | Unit | Example 1 | Example 2 | Example 3 | Example 4 | Example 5 |
|---|---|---|---|---|---|---|---|---|
| Composition of refrigerator oil | PVE mixing ratio | PVE (A) | mass % | 10 | 30 | 40 | 50 | 60 |
|  |  | PVE (B) | mass % | 90 | 70 | 60 | 50 | 40 |
|  |  | Total | mass % | 100.00 | 100.00 | 100.00 | 100.00 | 100.00 |
| Properties of PVE *1 | 40° C. kinematic viscosity |  | mm²/s | 64.4 | 61.9 | 65.7 | 63.0 | 65.2 |
|  | Viscosity index (VI) |  | — | 87 | 81 | 79 | 75 | 71 |
| Characteristics of refrigerator oil | Two-layer separation temperature at the high-temperature side |  | ° C. | 53.6 | 54.8 | 56.1 | 58.3 | 62.1 |
|  | Two-layer separation temperature at the low-temperature side |  | ° C. | −5.2 | −11.3 | −23.2 | −34.2 | −47.8 |
|  | Storage stability *2 |  | — | A | A | A | A | A |

|  |  |  | Unit | Example 6 | Example 7 | Comparative Example 1 | Comparative Example 2 |
|---|---|---|---|---|---|---|---|
| Composition of refrigerator oil | PVE mixing ratio | PVE (A) | mass % | 70 | 80 | 100 | — |
|  |  | PVE (B) | mass % | 30 | 20 | — | 100 |
|  |  | Total | mass % | 100.00 | 100.00 | 100.00 | 100.00 |
| Properties of PVE *1 | 40° C. kinematic viscosity |  | mm²/s | 59.4 | 64.9 | 68.0 | 71.0 |
|  | Viscosity index (VI) |  | — | 67 | 64 | 57 | 88 |
| Characteristics of refrigerator oil | Two-layer separation temperature at the high-temperature side |  | ° C. | 66.4 | 70< | 70< | 51 |
|  | Two-layer separation temperature at the low-temperature side |  | ° C. | −50> | −50> | −50> | −2 |
|  | Storage stability *2 |  | — | A | B | C | A |

*1: The mixture of PVE (A) and PVE (B) mixed in the mixing ratio described in each Example was measured.
*2: Stability after storage at −5° C. for 30 days

TABLE 2

|  |  | Unit | Example 8 | Example 9 | Example 10 | Example 11 | Example 12 | Example 13 | Example 14 |
|---|---|---|---|---|---|---|---|---|---|
| Composition of refrigerator oil | Component (A): PVE (A) | mass % | 58.02 | 59.4 | 59.22 | 59.04 | 58.92 | 58.62 | 58.62 |
|  | Component (B): PVE (B) | mass % | 38.68 | 39.6 | 39.48 | 39.36 | 39.28 | 39.08 | 39.08 |
|  | Component (C): Antioxidant | mass % | 0.30 | — | 0.30 | 0.30 | 0.30 | 0.30 | 0.30 |
|  | Component (D): Acid scavenger | mass % | 2.00 | — | — | 0.30 | 0.50 | 1.00 | 2.00 |
|  | Component (E): Extreme pressure agent | mass % | 1.00 | 1.00 | 1.00 | 1.00 | 1.00 | 1.00 | — |
|  | Total | mass % | 100.00 | 100.00 | 100.00 | 100.00 | 100.00 | 100.00 | 100.00 |
|  | PVE mixing ratio PVE (A) | mass % | 60 | 60 | 60 | 60 | 60 | 60 | 60 |
|  | PVE (B) | mass % | 40 | 40 | 40 | 40 | 40 | 40 | 40 |
| Characteristics of refrigerator oil | Acid number after thermal stability test | mgKOH/g | 0.07 | 1.20 | 1.05 | 0.78 | 0.56 | 0.22 | 0.01 |

TABLE 3

|  |  | Unit | Example 14 | Example 15 | Example 8 | Example 16 | Comparative Example 3 |
|---|---|---|---|---|---|---|---|
| Composition of refrigerator oil | Component (A): PVE (A) | mass % | 58.62 | 58.32 | 58.02 | 57.42 | — |
|  | Component (B): PVE (B) | mass % | 39.08 | 38.88 | 38.68 | 38.28 | 97.70 |
|  | Component (C): Antioxidant | mass % | 0.30 | 0.30 | 0.30 | 0.30 | 0.30 |
|  | Component (D): Acid scavenger | mass % | 2.00 | 2.00 | 2.00 | 2.00 | 2.00 |
|  | Component (E): Extreme pressure agent | mass % | — | 0.50 | 1.00 | 2.00 | — |
|  | Total | mass % | 100.00 | 100.00 | 100.00 | 100.00 | 100.00 |
|  | PVE mixing ratio PVE (A) | mass % | 60 | 60 | 60 | 60 | — |
|  | PVE (B) | mass % | 40 | 40 | 40 | 40 | 100 |
| Characteristics of refrigerator oil | Ring wear amount after lubricity test | mg | 1.0 | 0.8 | 0.6 | 0.5 | 2.4 |

As shown in Table 1, it was confirmed that the refrigerator oils of Examples 1 to 7 are not only excellent in the compatibility with difluoromethane (R32) but also favorable in the storage stability. The refrigerator oils of Examples 8 to 16 as shown in Tables 2 and 3 are each one containing the component (A) and the component (B) in the same mass ratio as in the refrigerator oil of Example 5 and further containing at least one selected from the group consisting of the component (C) to the component (E). With respect to the compatibility of the refrigerator oil of each of these Examples with difluoromethane (R32), it is free from any influence in the case of adding the component (C) to the component (E) to the refrigerator oil of Example 5. For example, the two-layer separation temperature at the high-temperature side of the refrigerator oil of Example 8 was 66.4° C., and as for the two-layer separation temperature at the low-temperature side, even when the temperature was decreased to −50° C., no two-layer separation was caused. In addition, the same is applicable to the storage stability, and for example, the evaluation result of the storage stability of Example 8 was graded as "A".

On the other hand, it was confirmed that the refrigerator oil of Comparative Example 1 was inferior in the storage stability because it does not contain the component (B). In addition, it was confirmed that the refrigerator oil of Comparative Example 2 was inferior in the compatibility with difluoromethane (R32) at the low-temperature side because it does not contain the component (A).

As shown in Tables 2 and 3, the following was confirmed from the evaluation results of each of the Examples in which the component (C) to the component (E) were blended in the refrigerator oil having a mixing ratio of the component (A) to the component (B) of 60/40 (mass ratio), while changing the blending ratio.

That is, from comparison between Examples 8 and 14 in Table 2, when the extreme pressure agent (E) is contained, there is a tendency that the acid number increases. However, as shown in Tables 2 and 3, by jointly using the antioxidant (C) and the acid scavenger (D), it is possible to improve the wear resistance while suppressing the increase of the acid number to be caused due to the extreme pressure agent (E).

In addition, from comparison between Example 14 and Comparative Example 3 in Table 3, it was confirmed that when both the component (A) and the component (B) are contained, the wear resistance is more improved.

In consequence, from the viewpoint of a refrigerator oil that is especially excellent in thermal stability, it was confirmed that a refrigerator oil in which not only the component (C) and the component (D) are contained in addition to the component (A) and the component (B), but also the content of the component (E) is small as far as possible is preferred. In addition, from the viewpoint of obtaining a refrigerator oil that is excellent in a balance between exceptional thermal stability and wear resistance, it was confirmed that a refrigerator oil in which in addition to the component (A) and the component (B), the component (C) and the component (D) are jointly used, and a specified amount or more of the component (E) is further contained is preferred.

INDUSTRIAL APPLICABILITY

The refrigerator oil that is one embodiment of the present invention is not only excellent in the compatibility with a refrigerant but also favorable in the storage stability, and therefore, it is suitably used as a refrigerator oil to be blended in a refrigerator oil composition using a refrigerant. Furthermore, the refrigerator oil that is one embodiment of the present invention is excellent in the compatibility with a refrigerant over a wider temperature range of from low temperatures to high temperatures, and therefore, it is more suitably used as a refrigerator oil for a refrigerant containing difluoromethane (R32).

The invention claimed is:

1. A refrigerator oil, comprising:
(A) a polyvinyl ether-based compound (A) comprising a structural unit (a1) having a methoxy group in a side chain thereof in an amount of 50 mol % or more on a basis of 100 mol % of a whole amount of structural units excluding a terminal structural unit in a molecular structure thereof; and
(B) a polyvinyl ether-based compound (B) comprising a structural unit (b2) represented by formula (2) in an amount of more than 50 mol % on a basis of 100 mol % of a whole amount of structural units excluding a terminal structural unit in a molecular structure thereof:

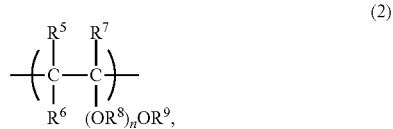

(2)

wherein:
$R^5$, $R^6$, and $R^7$ each independently represent a hydrogen atom or a hydrocarbon group having 1 or more and 8 or less carbon atoms;
$R^8$ represents a divalent hydrocarbon group having 2 or more and 10 or less carbon atoms; n represents a number of 0 or more and 10 or less; and
$R^9$ represents a hydrocarbon group having 2 or more and 10 or less carbon atoms;
wherein a content ratio [(A)/(B)] of the polyvinyl ether-based compound (A) and the polyvinyl ether-based compound (B) is 10/90 or more and 90/10 or less in terms of a mass ratio.

2. The refrigerator oil according to claim 1, wherein the structural unit (a1) is represented by formula (1):

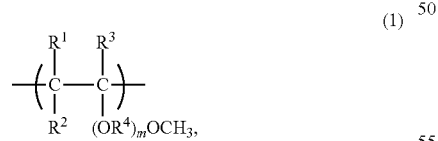

(1)

wherein:
$R^1$, $R^2$, and $R^3$ each independently represent a hydrogen atom or a hydrocarbon group having 1 or more and 8 or less carbon atoms;
$R^4$ represents a divalent hydrocarbon group having 2 or more and 10 or less carbon atoms; and
m represents a number of 0 or more and 10 or less.

3. The refrigerator oil according to claim 1, wherein a content of the structural unit (a1) in the polyvinyl ether-based compound (A) is 100 mol % on a basis of 100 mol % of the whole amount of the structural units excluding the terminal structural unit in the a molecular structure of the polyvinyl ether-based compound (A).

4. The refrigerator oil according to claim 1, wherein a content of the structural unit (b2) in the polyvinyl ether-based compound (B) is 100 mol % on a basis of 100 mol % of the whole amount of the structural units excluding the terminal structural unit in a molecular structure of the polyvinyl ether-based compound (B).

5. The refrigerator oil according to claim 1, wherein the structural unit (a1) is a structural unit (a1-2) represented by the following general formula (1-2):

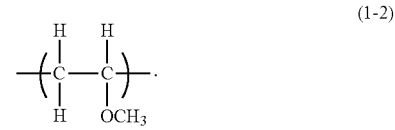

(1-2)

6. The refrigerator oil according to claim 1, wherein the structural unit (b2) is a structural unit (b2-3) represented by formula (2-3):

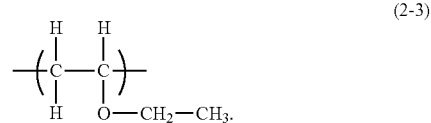

(2-3)

7. The refrigerator oil according to claim 1, wherein a total content of the polyvinyl ether-based compounds (A) and (B) is 70.0% by mass or more and 100% by mass or less on a basis of 100% by mass of a whole amount of the refrigerator oil.

8. The refrigerator oil according to claim 1, further comprising:
(C) an antioxidant (C) in an amount of 0.1% by mass or more and 5.0% by mass or less on a basis of 100% by mass of a whole amount of the refrigerator oil.

9. The refrigerator oil according to claim 1, further comprising:
(D) an acid scavenger (D) in an amount of 0.1% by mass or more and 10.0% by mass or less on a basis of 100% by mass of a whole amount of the refrigerator oil.

10. The refrigerator oil according to claim 1, further comprising:
(E): an extreme pressure agent (E) in an amount of 0.1% by mass or more and 5.0% by mass or less on a basis of 100% by mass of a whole amount of the refrigerator oil.

11. A refrigerator oil composition, comprising the refrigerator oil of claim 1 and a refrigerant.

12. The refrigerator oil composition according to claim 11, wherein the refrigerant is a refrigerant comprising at least one selected from the group consisting of a fluorinated hydrocarbon, a hydrocarbon-based refrigerant, carbon dioxide, and ammonia.

13. The refrigerator oil composition according to claim 11, wherein the refrigerant is a refrigerant comprising difluoromethane (R32).

14. A method of producing a refrigerator oil, the method comprising blending at least:
(A) a polyvinyl ether-based compound (A) comprising a structural unit (a1) having a methoxy group in a side chain thereof in an amount of 50 mol % or more on a basis of 100 mol % of a whole amount of structural units excluding a terminal structural unit in a molecular structure thereof; and (B) a polyvinyl ether-based compound (B) comprising a structural unit (b2) represented by formula (2) in an amount of more than 50 mol % on a basis of 100 mol % of a whole amount of structural units excluding a terminal structural unit in a molecular structure thereof, to obtain a refrigerator oil:

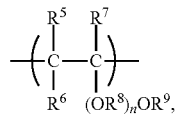
(2)

wherein:

$R^5$, $R^6$, and $R^7$ each independently represent a hydrogen atom or a hydrocarbon group having 1 or more and 8 or less carbon atoms;

$R^8$ represents a divalent hydrocarbon group having 2 or more and 10 or less carbon atoms; n represents a number of 0 or more and 10 or less; and $R^9$ represents a hydrocarbon group having 2 or more and 10 or less carbon atoms wherein a content ratio [(A)/(B)] of the polyvinyl ether-based compound (A) and the polyvinyl ether-based compound (B) is 10/90 or more and 90/10 or less in terms of a mass ratio.

* * * * *